US009875510B1

(12) United States Patent
Kasper

(10) Patent No.: US 9,875,510 B1
(45) Date of Patent: Jan. 23, 2018

(54) CONSENSUS SYSTEM FOR TRACKING PEER-TO-PEER DIGITAL RECORDS

(71) Applicant: Lance Kasper, Downers Grove, IL (US)

(72) Inventor: Lance Kasper, Downers Grove, IL (US)

( * ) Notice: Subject to any disclaimer, the term of this patent is extended or adjusted under 35 U.S.C. 154(b) by 93 days.

(21) Appl. No.: 14/706,247

(22) Filed: May 7, 2015

Related U.S. Application Data

(60) Provisional application No. 62/111,393, filed on Feb. 3, 2015.

(51) Int. Cl.
G07F 19/00 (2006.01)
G06Q 40/00 (2012.01)
H04L 29/08 (2006.01)

(52) U.S. Cl.
CPC ........... G06Q 40/12 (2013.12); H04L 67/104 (2013.01); G06F 2201/87 (2013.01)

(58) Field of Classification Search
CPC ... H04L 63/10; H04L 67/1097; H04L 63/083; G06Q 20/08; G06Q 20/0655
USPC ................. 726/3, 5; 705/39, 14.42
See application file for complete search history.

(56) References Cited

U.S. PATENT DOCUMENTS

| | | | | |
|---|---|---|---|---|
| 2013/0325701 | A1* | 12/2013 | Schwartz | G06Q 40/00 705/39 |
| 2015/0033301 | A1* | 1/2015 | Pianese | H04L 63/083 726/5 |
| 2015/0271183 | A1* | 9/2015 | MacGregor | H04L 63/102 726/4 |
| 2016/0224949 | A1* | 8/2016 | Thomas | G06Q 20/027 |
| 2016/0261690 | A1* | 9/2016 | Ford | H04L 67/1044 |

FOREIGN PATENT DOCUMENTS

WO 2012174553 12/2012

OTHER PUBLICATIONS

The Arithmetic of Voting, Guy Ottewell, Jul. 1987; reprinted with slight improvements Sep. 1999, Jan. 2001, Apr. 2004, http://www.universalworkshop.com/ARVOfull.htm.

(Continued)

*Primary Examiner* — Rokib Masud
(74) *Attorney, Agent, or Firm* — Law Offices of Konrad Sherinian, LLC

(57) ABSTRACT

The disclosure describes a peer-to-peer consensus system and method for achieving consensus in tracking transferrable digital objects. The system achieves consensus on a shared ledger between a plurality of peers and prevents double spending in light of network latency, data corruption and intentional manipulation of the system. Consensus is achieved and double spending is prevented via the use of the most committed stake metric to choose a single consensus transaction record. A trustable record is also facilitated by allowing stakeholders to elect a set of trusted non-colluding parties to cooperatively add transactions to the consensus record. The voting mechanism is a real-time auditable stake weighted approval voting mechanism. This voting mechanism has far reaching applications such as vote directed capital and providing a trusted source for data input into a digital consensus system. The system further enables digital assets that track the value of conventional assets with low counterparty risk.

6 Claims, 16 Drawing Sheets

(56) References Cited

OTHER PUBLICATIONS

Bitcoin Developer Guide, https://bitcoin.org/en/developer-guide.
Bitcoin: A Peer-to-Peer Electronic Cash System, Satoshi Nakamoto, satoshin@gmx.com, www.bitcoin.org.
The Byzantine Generals Problem, Leslie Lamport, Robert Shostak, and Marshall Pease, SRI International, ACM Transactions on Programming Languages and Systems, vol. 4, No. 3, Jul. 1982.
Why Approval Voting is Unworkable in Contested Elections, by the Non-Majority Rule Desk // Published Jul. 30, 2011, http://www.fairvote.org/research-and-analysis/blog/why-approval-voting- . . . .
The math of Nxt forging, mthcl, Jun. 29, 2014. Version 0.5.1,.
Distributed Consensus from Proof of Stake is Impossible, Andrew Poelstra, May 28, 2014.
PPCoin: Peer-to-Peer Crypto-Currency with Proof-of-Stake, Sunny King, Scott Nadal (sunnyking9999@gmail.com, scott.nadal@gmail.com) Aug. 19, 2012.
Tezos: A Self-Amending Crypto-Ledger, Position Paper, L.M Goodman, C97F A4A2 BAA6 0620 9DFA E274 2302 04F4 09F0 586D, Aug. 3, 2014.
The Ripple Protocol Consensus Algorithm, David Schwartz, david@ripple.com, Noah Youngs, nyoungs@nyu.edu, Arthur Britto, arthur@ripple.com, Ripple Labs Inc, 2014.
Tendermint: Consensus without Mining, Jae Kwon, yk239@cornell.edu, Draft v.0.6.
Tezos—a self-amending crypto-ledger, White paper, L.M Goodman, Sep. 2, 2014.
https://bitsharestalk.org/index.php/topic,7816, Aug. 28, 2014.
https://bitsharestalk.org/index.php/topic,5704.0.html, Jul. 17, 2014.
https://bitsharestalk.org/index.php/topic,4009.msg66308.html#msg66308, Jun. 11, 2014.
NeuCoin: the First Secure, Cost-effcient and Decentralized Cryptocurrency, Jun. 15, 2015, Kourosh Davarpanah, neucoin.org/en/wiki.
Transactions as Proof-of-Stake, by Daniel Larimer, Nov. 28, 2013.

* cited by examiner

| | balance | selected candidates | approval width | Block Signer Candidate # Votes | | | | | | | Block Signer Candidate # Summed Approval | | | | | | |
|---|---|---|---|---|---|---|---|---|---|---|---|---|---|---|---|---|---|
| | | | | #1 | #2 | #3 | #4 | #5 | #6 | #7 | #1 | #2 | #3 | #4 | #5 | #6 | #7 |
| 212 | 14 | 4 | 0.25 | | ✓ | ✓ | ✓ | | ✓ | ✓ | 4 | 20 | 29 | 54 | 31 | 66 | 64 |
| 213 | 5 | 4 | 0.25 | | | ✓ | ✓ | ✓ | ✓ | ✓ | 4 | 6 | 15 | 54 | 31 | 52 | 50 |
| 214 | 2 | 4 | 0.25 | | | | ✓ | ✓ | ✓ | ✓ | 4 | 6 | 15 | 49 | 26 | 47 | 45 |
| 215 | 5 | 4 | 0.25 | | ✓ | ✓ | ✓ | ✓ | | ✓ | 4 | 6 | 13 | 47 | 24 | 47 | 43 |
| 216 | 8 | 4 | 0.25 | ✓ | | | ✓ | ✓ | ✓ | ✓ | 4 | 1 | 13 | 42 | 19 | 42 | 43 |
| 217 | 4 | 3 | 0.33 | | ✓ | ✓ | ✓ | | | | 4 | 1 | 5 | 34 | 19 | 34 | 35 |
| 218 | 6 | 3 | 0.33 | | | | ✓ | ✓ | ✓ | | 0 | 1 | 5 | 30 | 19 | 30 | 35 |
| 219 | 7 | 3 | 0.33 | | | | | | ✓ | ✓ | 0 | 1 | 5 | 24 | 13 | 23 | 29 |
| 220 | 1 | 3 | 0.33 | | | | ✓ | ✓ | ✓ | | 0 | 1 | 4 | 17 | 13 | 23 | 22 |
| 221 | 10 | 2 | 0.5 | | | | ✓ | | ✓ | | 0 | 0 | 4 | 16 | 3 | 13 | 22 |
| 222 | 3 | 2 | 0.5 | | | | | | ✓ | | 0 | 0 | 4 | 16 | 0 | 13 | 22 |
| 223 | 4 | 2 | 0.5 | | | | ✓ | | | ✓ | 0 | 0 | 4 | 13 | 0 | 9 | 22 |
| 224 | 13 | 2 | 0.5 | | | ✓ | | | | | 0 | 0 | 4 | 13 | 0 | 9 | 18 |
| 225 | 9 | 1 | 1 | | | | | | | ✓ | 0 | 0 | 4 | 0 | 0 | 0 | 5 |
| 226 | 4 | 1 | 1 | | | | | | | | 0 | 0 | 0 | 0 | 0 | 0 | 5 |
| 227 | 5 | 1 | 1 | | | | | | | | 0 | 0 | 0 | 0 | 0 | 0 | 5 |

202 / 204 / 206 / 208 / 210 / 232 / 234 / 242 / 244 / 246 / 248 / 250 / 252 / 254

CONSENSUS SYSTEM FOR TRACKING PEER-TO-PEER DIGITAL RECORDS

CROSS REFERENCE TO RELATED APPLICATIONS

This application claims the benefit and priority of U.S. Patent Application No. 62/111,393, entitled "Method to achieve consensus for system of transferrable digital objects," filed Mar. 7, 2015, which is hereby incorporated by reference in its entirety.

FIELD OF THE DISCLOSURE

The present invention relates to a system and method for creating and tracking digital objects and records in a decentralized manner, and more particularly relates to a system and method for tracking digital objects with consensus in the networked system.

DESCRIPTION OF BACKGROUND

The exchange of value is increasingly moving into the digital realm. Everything from game points, credits, frequent flyer miles, to more traditional financial transactions and records are being tracked digitally. Most of these digital objects are tracked by an issuing authority or central record keeping entity. Keeping track of transferrable ownership rights historically required a central record keeping authority trusted by those exchanging said ownership rights. The record keeping authority typically verifies property owners via some form of identification or signature and records all valid property transfers to maintain a record of the current state of ownership. Banks using digital representations of money are trusted to verify identities and keep accurate records of deposits and transfers. A company issuing reward points or game points would also fulfill this role.

There are times, however, when relying on a central authority is not desirable. Participants who rely on these digital tokens to be tracked and recorded accurately may feel that a central authority is a single point of potential failure and a single point of trust. This authority may be subject to various internal or external pressures or corruption. There is a need and market for systems of value tracking that function in a more peer to peer (also referred to herein as peer-to-peer and P2P) fashion or where participants have greater control over the record keeping system rather than a single record keeper. For example, crypto-currencies (also referred to herein as cryptocurrency), such as Bitcoin promoted by Bitcoin.com ("Bitcoin"), track digital tokens in a more decentralized manner. Crypto-currencies use cryptographic digital signatures in place of traditional methods of identity verification as proof of ownership of digital assets.

Tracking digital tokens over a peer-to-peer network without a central record keeping authority however, presents a considerable technical challenge. The challenge can be broken into a two part problem of achieving verifiable signatures for transfers and maintaining a ledger that is consistent among all participants.

The application of public key cryptography solves one part of the challenge of a peer-to-peer digital currency. Public key cryptography signing algorithms allow for unambiguous digital signatures. A private cryptographic key is a large random number generated locally on a user's computer such that it is known only to that user. A public key can be derived from the private key. As long as the private key is kept secret, any signature produced using the private key serves as proof that the signer is the same party that originally published the public key. In addition to proving the source of a signed message, the signature also ensures that no data in the message can be lost or changed without invalidating the signature. Public keys can be recorded in a ledger of ownership rights. Digital assets can be associated with these public keys such that the public keys serve as the digital representation of the owner of the assets. A transfer of ownership of a digital asset from one public key to another can be signed with the secret private key of the sender to prove the authenticity and integrity of the message.

Unambiguous digital signatures, while useful, do not fully solve the problem of verifiable trusted record keeping. If we imagine an initial public ledger with an agreed upon list of public keys and associated digital assets, any transfers would need to be signed with the corresponding private key known only to the sender in order to be accepted. Any central record keeping authority tasked with recording changes and transfers to the ledger would have no way to forge such a transfer if it was not initiated and signed by the sender. However, many potential combinations of a set (meaning one or more) of valid signed transactions could be joined together by a record keeper to create a seemingly valid record. For instance, some transfers could simply be omitted or censored.

It is also possible for two transactions to each be individually valid but conflict with each other, thus giving the record keeper the choice of which to present. For instance, a digital asset owner may attempt to sell the same asset twice by signing two or more messages that each transfers the asset to a different public key. In such a case, the owner is said to be double spending her asset and the issue of double spending is referred to herein as a Double Spend problem. An untrustworthy record keeper could choose to present different versions of the record at different times or to different people such that the record, even with valid signatures, could not be relied upon.

Accordingly, a peer-to-peer digital record system that achieves agreement on the record while overcoming additional systemic challenges is desired. Such a system is referred to herein as a consensus system. As used herein, consensus refers to the process by which the entire network agrees on the same ledger. Accordingly, a consensus system is a networked system capable of reaching consensus. Network latency associated with global data transmission prevents all peers from receiving information at the same time or in the same order. Peers may disconnect and reconnect at will, data can be corrupted or missing, and some peers may intentionally supply or relay inaccurate information. These types of challenges to consensus are a long recognized problem in computer science known as a Byzantine Generals Problem. The consensus system must overcome such challenges to allow the creation of a record that can be trusted and cannot be manipulated.

Bitcoin is the most well-known attempt to tackle the problem of peer-to-peer consensus for digital token tracking. Peers on a global network will not receive all broadcasted transactions at the same time and in the same order due to, for example, network latency. Therefore, if peers were to simply accept all transactions as they were received and reject anything conflicting that came later, it would lead to disagreement. For instance, if two conflicting transactions were simultaneously broadcast, some peers would receive one transaction first and accept it, and other peers would receive the other transaction first and accept it instead, so there would no longer be a consistent record. In this case, some peers would need to switch to maintain consistency.

On the other hand, it should not be possible to get the network to switch to a conflicting transaction broadcast long after the original, as this would defeat the utility of the peer-to-peer transaction system.

Bitcoin tackles this issue by grouping transactions into blocks which can generally be propagated to the whole network before a new block of transactions is produced. For example, approximately six times per hour, a new group of accepted transactions, a block, is created, added to a block chain, and quickly published to all nodes on the transaction network system. The rate of this block production is limited by requiring inclusion of a difficult to find solution to a cryptographic function based on the block data. If valid solutions are found too quickly, the size of the range of valid solutions adjusts to be more restrictive to increase the difficulty and maintain a reasonably steady rate of block production. Each block references and builds off a previous block using cryptographic functions called hashes. A hash function takes arbitrary digital data as input and returns a fixed length pseudo random number as output. To solve a block, an additional piece of data must be found that when combined with block data and data that links to the previous block generates hash function output that falls within a very restrictive range set by the protocol. Tying each block to its previous block with these hash functions generates what is known as a block chain containing all accepted transactions. A block chain thus forms a public record of all transactions. A current ledger representing the state of ownership of digital tokens can be deduced from the full record of transactions in a block chain beginning with the first block. In a block chain, each block contains a cryptographic hash of the immediate previous block or a similar reference that links it to the immediate previous block. If any data is changed or missing, the calculated cryptographic hashes would change for all blocks from that point forward. The changed hashes would also no longer fall within the restrictive range required by the Bitcoin protocol, so the chain would be invalid.

A valid solution to a block is called a proof of work ("PoW") and the process of finding these solutions is called mining. In other words, mining is the activity of verifying and recording payments into the public ledger. The miner of a block accepted by the network is rewarded in the form of Bitcoin transaction fees from included transactions in addition to a fixed block reward. Only the longest block chain that includes the most PoW is accepted by the network as the consensus block chain. If more than one block solution is found at the same time only one of these blocks can ultimately be accepted, as each block in the chain must reference the preceding block. Other miners must choose to work on a solution that builds off one of these two available blocks and the next published block will make one block chain longer than the other. The shorter chain is then rejected by the network and its miner cannot redeem the block reward.

Miners try to make sure they are always working on the longest known chain in order to ensure that any block found is accepted in the longest chain (also referred to herein as LC) to get the reward. Miners will quickly abandon any shorter chains to avoid expending work without reward. This creates a cooperative process where self-interested miners must cooperate to extend a single longest chain. The longer the chain becomes that builds on an included transaction the more difficult it is to change that transaction. Changing the transaction would require building a longer chain with more proof of work than the public chain. Considering the public chain is built via a cooperative process of miners all over the world, building a longer chain is not an easy task. To create a longer chain in secret in order to change a transaction (such as Double Spend) would essentially require controlling more computation power than the rest of the network combined. It is assumed to be unlikely that any party will control more computation power than the rest of the network adding to the public chain.

Bitcoin's PoW consensus algorithm (also referred to herein as protocol) however, has drawbacks. As the value of Bitcoin has grown, Bitcoin mining has become very competitive. Rather than a decentralized network of people performing PoW using their personal computers, huge warehouses with specialized hardware have been set up to maximize efficiency. Mining pools have been created so operators can pool their PoW together to share block rewards and reduce the uncertainty of reward payouts. PoW also relies on arbitrarily difficult computation and the difficulty is automatically increased if solutions are found too quickly. This computation for the sake of proving computation consumes an enormous amount of electricity. Economies of scale in PoW mining have also allowed control over the Bitcoin ledger to be more centralized than originally anticipated. Therefore, there is a high demand for more efficient algorithms to achieve consensus on a signed shared ledger over a decentralized computer network.

Many attempts have been made to find better PoW algorithms that are more conducive to being solved using standard consumer computing equipment and more resistant to the creation of cheap specialized mining hardware. The Litecoin™ project (Litecoin.org) is an example of such an attempt. These attempts have only delayed the creation of specialized mining hardware and still suffer the same centralization problems due to economies of scale. Specialized hardware is now available for mining Litecoin™. The solution of using a different PoW algorithm also does not address issues of energy waste.

A number of other strategies to consensus have been proposed or are being developed. These recent consensus algorithms are often implemented in popular crypto-currencies. Crypto-currencies that employ the recently proposed consensus algorithms include Ripple™ (proposed by Ripple Labs), Peercoin (also known as PPCoin or PPC), NXT (an open source cryptocurrency and payment network launched in November 2013 by anonymous software developer BCNext), and BitShares (a decentralized exchange network system proposed by Bitshares.org).

The Ripple™ network uses a consensus algorithm that does not rely on PoW. Ripple™ protocol utilizes peer-to-peer nodes that accept transactions and confirm them after a high level of agreement is reached among their peers. A drawback to the Ripple™ consensus algorithm is that the interests of the validating nodes are not necessarily tied to or aligned with the interests of the holders and users (also referred to herein as stakeholders) of the digital currency. The currency holders must trust the validating nodes not to collude but they have no effective power to prevent it. The selection of validating nodes is not done by currency holders.

Stellar™, which is a project (stellar.org) that branched off of the Ripple™ project and uses a very similar consensus algorithm, recently experienced a fork of its payment network where consensus broke down and was not achieved throughout the network. The Stellar project has moved to a central validating authority while it works to improve its consensus algorithm.

A shared concept behind a number of recently proposed consensus protocols is called proof of stake ("PoS") as opposed to PoW. With PoW, the ability to extend the transaction ledger is proportional to computing power. The idea behind PoS is to make control of the public ledger proportional to ownership stake of the digital currency. It is hoped that PoS will be more energy efficient and more appropriately distribute control over the ledger. A number of PoS systems are structured in a similar way to PoW mining. Just as in PoW mining, PoS mining (also called staking, minting, or forging) requires finding blocks whose block hash falls within a restrictive range; the inclusion of a block in the consensus chain entitles the PoS miner to a block reward. However, the difficulty of finding a valid block hash or the range of valid solutions depends on the ownership stake controlled by the miner. Both Peercoin and NXT utilize such a system where stakeholders use their stake to mine for blocks.

There are numerous drawbacks to this method of consensus as well. Unlike with PoW mining, PoS does not incur a substantial amount of cost to looking for block solutions that are not on the current longest chain. Therefore, creating a longer chain than the current longest public chain might be more likely as there is less cost to look for it. Such a drawback to PoS protocols is known as the Nothing at Stake problem. Another drawback to the PoS model is that it requires the private key of a miner to remain unencrypted on a network connected computer.

The original design of both the NXT and Peercoin PoS consensus mechanisms require stakeholders to keep private keys unencrypted and on a network connected computer in order to attempt to sign blocks using the private keys. This requirement poses a security risk in that a network connected computer is vulnerable to being remotely compromised and the private key could be stolen. The gold standard for carefully protecting stake in a cryptocurrency system is to generate a private key/public key pair on an offline computer; funds can be sent to a party associated with this public key even though the private key has never been on a computer connected to the Internet. It is generally not worth the risk, effort, or cost for small stakeholders to run a computer to look for block solutions using their private keys. So such systems tend to become more centrally controlled than desired. In order to address this issue, the NXT project implemented a system called Leased Forging where block signing rights could be delegated to another key separate from the private key that otherwise controls transfer of funds. Recently, the same system is planned to be implemented in Peercoin protocol. Unfortunately this process opens up a new and significant issue for the consensus algorithm.

Leased block signing rights create a condition which economists term as Market Failure. A rationally self-interested stakeholder will lease stake to the highest bidder rather than to the block signer that may be most trusted or the best for the network as a whole. Leasing to the highest bidder can also lead to centralized control of the ledger by the highest bidder. The incentives of this entity(s) may not align with other stakeholders. For example, such an entity may be attempting to double spend transactions or want to control the network for another reason. The NXT protocol attempts to address this issue with limits to the amount of stake that can be leased to a single public key. Such limits are commonly accepted as sufficient to address the issue; and the NXT project has otherwise been accepting of profit sharing or "lease to the highest bidder" behavior. In reality many public keys can be controlled by a single entity and such limits to ensure decentralization are easy to circumvent.

In April of 2014, Daniel Larimer, a founder of the BitShares project proposed a consensus algorithm called Delegated Proof of Stake ("DPOS"). The design allowed anyone to delegate his stake to another public key (meaning associating the delegated stake with the public key) for the purpose of block signing. The top 101 public keys with the most stake delegated to them would take turns producing blocks. Anyone who controls one of these 101 public keys is called a "delegate" and is charged with producing and signing blocks with the corresponding private key. Block production is grouped into rounds. The order of delegate block production within a round is randomized. Each round, delegates publish a hash of a secret random number and also reveal the secret random number that was used to generate the hash published in the previous round. These revealed secrets are hashed together to get a random number that can be used to randomize the order of delegates in the following round. The use of hashes forces delegates to commit to their random number before knowing what the other random numbers will be and as long as at least one delegate is honest about keeping their random number secret this will be an effective way to randomize the block production within the round.

This DPOS design suffers a similar issue to NXT's Leased Forging; it encourages "delegation to the highest bidder" in the same way that NXT's Leased Forging encourages "leasing to the highest bidder". In other words, it does not lead to broadly trusted block signers. Delegating stake to a delegate can be thought of as voting for a block signer. It was suggested that if stakeholders were allowed to vote either for or against candidate block signers (weighted by their stake) this could allow stakeholders to remove an untrustworthy block signer. Unfortunately this proposal did not solve the poor incentives that lead to block signing power going to the highest bidder. As proposed, voting against block signers who pay for votes would have a high opportunity cost over voting for them and sharing in any profit. It would also be largely ineffective against candidate block signers who could switch to a new public key after accumulating too many negative votes. Thus voting against a delegate could become a game of "cat and mouse" involving constant pursuit.

There are at least two additional major limitations to most cryptocurrencies such as Bitcoin. These commonly acknowledged drawbacks are price volatility and also a lack of an effective means to fund ongoing development of a cryptocurrency protocol. While Bitcoin has useful properties such as being easy and inexpensive to transfer, its price volatility makes it risky to hold and difficult to use for everyday pricing and payments. A digital token with the properties and advantages of crypto-currencies that maintain price parity with a globally adopted currency such as the US Dollar ("USD") could be more convenient for most commerce. Attempts to address the price volatility of Bitcoin have primarily focused on using digital tokens to represent an asset held by a particular party or institution. These tokens, sometimes called colored coins can be thought of as a tradeable "I owe you" ("IOU") on a block chain. A drawback to this idea is that there is significant centralized counterparty risk. The digital token's value is dependent on it being honored by a particular party in exchange for another asset.

Funding the ongoing development of a digital token tracking system has been a difficult problem to solve. Often the projects are computer software open source development projects and rely on volunteers for development. Essentially, the present decentralized systems have no mechanism to effectively centralize the resources needed to incentivize developers of the system. Ongoing development of a project such as Bitcoin is an economic "public good" problem. In the past, ongoing funding for development has been provided by donations from non-profit organizations, large stakeholders, or companies that use the system such as a company that sells Bitcoin related services. Recently, "assurance contracts" have begun to be used for fundraising whereby a specific fundraising target must be reached otherwise donations are returned. Although this may offer some improvement it has not been sufficient to provide a substantial funding source. Even when considering high value systems such as Bitcoin, resources to directly fund development have been scarce. A great number of smaller projects have been abandoned or remain underdeveloped due to this issue.

Peer-to-peer systems for tracking digital records must reach consensus in the face of network latency, data corruption, and various intentional methods to manipulate or disrupt the system. One of the most important challenges of peer-to-peer digital record keeping is to determine how block signers are chosen to add transactions to the public record. Prior consensus mechanisms have not solved the issue of how to choose the most qualified and trusted block signers from a decentralized network of rationally self-interested stakeholders. Some systems such as Bitcoin and Ripple have disenfranchised stakeholders by deferring to another metric such as computation power or inclusion in a unique node list. Other PoS implementations fail to create the right incentives for appropriate control of block signing power and the public record.

Accordingly, there is a need for a new peer-to-peer consensus system that provides verifiable signatures and maintains a ledger that is consistent among all participants of the networked system. The new system achieves consensus with less power consumption. In addition, the new system achieves consensus despite network latency, data corruption and other issues. In addition the new system maintains a ledger that is resistant to Double Spend or other intentional manipulation. Furthermore, the new peer-to-peer consensus system overcomes the drawbacks of price volatility and promotes funding for development of the underlying project.

OBJECTS OF THE DISCLOSED SYSTEM, METHOD, AND APPARATUS

Accordingly, it is an object of this disclosure to provide a system and method for tracking digital objects with consensus in a network.

Another object of this disclosure is to provide a peer-to-peer system and method for achieving consensus in tracking digital objects.

Another object of this disclosure is to provide a peer-to-peer system and method for achieving consensus in tracking digital objects and maintaining a consistent ledger.

Another object of this disclosure is to provide a peer-to-peer system and method for achieving consensus in tracking digital objects and maintaining a consistent ledger with verifiable trusted record keeping.

Another object of this disclosure is to provide a peer-to-peer system and method for achieving consensus in tracking digital objects, maintaining a consistent ledger, and overcoming network latency, data corruption and malicious manipulation.

Another object of this disclosure is to provide a peer-to-peer consensus system and method by electing block signers.

Another object of this disclosure is to provide a peer-to-peer consensus system and method by electing block signers, and voting out and ignoring untrusted block signers.

Another object of this disclosure is to provide a peer-to-peer consensus system and method by electing block signers using approval width and approval height.

Another object of this disclosure is to provide a peer-to-peer consensus system and method by electing block signers using approval width, approval height, summed approval, and mapped approval width.

Another object of this disclosure is to provide a peer-to-peer consensus system and method by determining a widest chain.

Another object of this disclosure is to provide a peer-to-peer consensus system and method by determining a widest chain and merging fork block chains based on the widest chain.

Another object of this disclosure is to provide a peer-to-peer consensus system and method by determining a widest chain and defending against Double Spend based on the widest chain.

Another object of this disclosure is to provide a peer-to-peer consensus system and method by ignoring hidden chains.

Another object of this disclosure is to provide a peer-to-peer consensus system and method that reduces price volatility.

Another object of this disclosure is to provide a peer-to-peer consensus system and method that promotes on-going system development.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a peer-to-peer consensus system and method for creating a trustable record for tracking transferrable digital objects in a consensus manner. Transfers and tracking of these digital objects over a computer network is facilitated by protocol rules that encourage the creation of an efficient, trustable, and shared record. Further, in accordance with the principles of the present disclosure, a system and method for voting using digital stake balances tracked on a shared consensus ledger is presented. The method of voting is a real time auditable stake weighted approval voting mechanism wherein votes are signed via cryptographic signatures. The method of voting allows for the election of trustable entities who act in the best interest of the digital stake holders. In accordance with the principles of the present disclosure these trustable entities may commit broadcasted transactions to the shared consensus ledger. These trustable entities may group transactions into blocks in the process of committing them to the shared transaction record. In accordance with the principles of the present disclosure these trustable entities may receive a salary denominated in digital stake and direct capital for the benefit of the digital stakeholders. The trusted entities may be used for a trustable source of information such as a data feed. In addition, a consensus system is presented that utilizes an improved metric to select a single consensus transaction history from multiple potentially valid transaction histories. A method is described such that when comparing multiple transaction histories, the transaction history with the most committed stake is chosen. Furthermore a method is described for the creation of digital assets that track the value of conventional assets.

The peer-to-peer consensus system includes a plurality of node computers. Each node computer in the plurality of node computer includes a processing unit, some amount of memory accessed by the processing unit, and a network interface operatively coupled to the processing unit and a wide area network. The wide area network can be, for example, the Internet. Each node computer in the plurality of node computer includes a consensus system software application running on the processing unit of the node computer. The consensus system software application is adapted to connect to the plurality of node computers that are connected to the wide area network. The computer software application running on networked computers of the consensus system can be, for example, open source based software.

The consensus system software application is also adapted to generate a cryptographic key pair including a private key and a public key. Moreover, the consensus system software application is adapted to create and sign transactions using the private key and to broadcast transactions to the plurality of node computers. The consensus system software application is adapted to broadcast transactions that associate votes with stake balances. The consensus system software application is further adapted to check validity of all signatures on transactions received from peers, and determine that consensus protocol rules have been followed. The consensus system software application is adapted to build and maintain a local ledger of the current balances of stake controlled by each public key; this ledger is derived from the initial ledger state and the records of transactions contained in the consensus transaction history. The consensus system software application is adapted to choose a consensus transaction history from multiple transaction histories using a metric of most committed stake. Furthermore, the consensus system includes the ability to merge transaction histories into a single transaction history.

The improved system creates a method of automated public accounting that is resistant to manipulation. It is therefore valuable to participants due to the high level of trust that can be placed in the system and the low overhead of operation. The system further appropriately balances control over the shared ledger and adds enough opportunity for independent audits, checks, and redundancies that any manipulation requires too much secret collusion and coordination to be practical or worthwhile to attempt. The improved system can codify social agreements about ownership and then automate the accounting of the social agreements.

BRIEF DESCRIPTION OF THE DRAWINGS

The foregoing aspects and many of the advantages of the present invention will be more readily appreciated as the same becomes better understood by reference to the following detailed description, when taken in conjunction with the accompanying drawings. Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 2 is a simplified table depicting approval width and approval height of a set of blocker signers in accordance with the teachings of this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings. Furthermore, a particular order in which certain elements, parts, components, modules, steps, actions, events and/or processes are described or illustrated may not be actually required.

DETAILED DESCRIPTION

Figure 1:
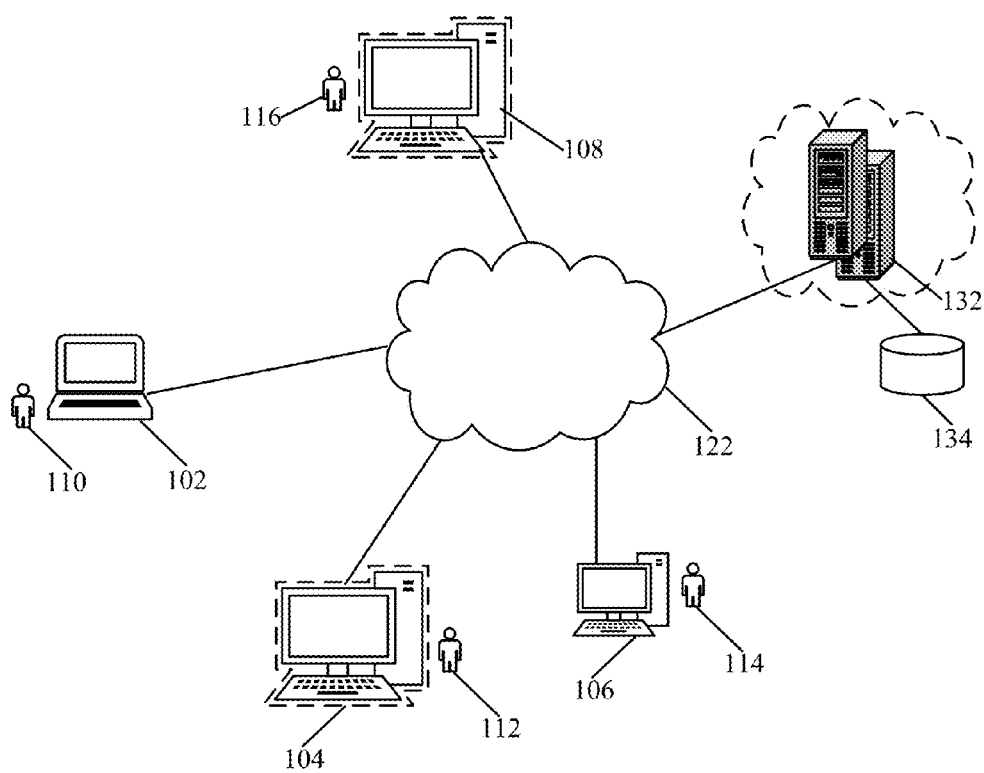
FIG. 1 is a simplified block diagram of a consensus system for tracking digital records in accordance with the teachings of this disclosure.

Turning to the Figures and to FIG. 1 in particular, a networked system for conducting peer-to-peer transactions with consensus is shown and generally indicated at 100. The system 100 tracks digital records with consensus. The system 100 includes a plurality of nodes, such as the computers 102, 104, 106 and 108. Only four nodes 102-108 are shown in the illustrative FIG. 1. A person of ordinary skill in the art will appreciate that more nodes can be included for commercial implementation of the system 100. The computers 102-108 each include a processing unit (such as a central processor), some amount of memory accessed by the processing unit, and a network interface operatively coupled to the processing unit. In addition, the nodes 102-108 each run a special consensus system software application program on their respective processing units. Each node is used and operated by a user, such as the users 110, 112, 114 and 116. The users 110-116 conduct transactions between themselves in a peer-to-peer manner using the special consensus system program. The system 100 is also referred to herein as a consensus network.

The consensus system software application is computer code that performs specific functions for achieving consensus regarding digital objects over the system 100 (as used herein a digital object can be a digital record, stake, asset, token, voting right etc. The computer code is written in one or more computer programming languages, such as C++, C#, Java, etc. The computer code controls and actuates the computers 102-108 to perform the unique functions of achieving consensus of transferrable digital objects in the system 100. The computer code is thus analogous to an electronic circuit for performing these specific functions. Accordingly, it can be said that the specialized consensus system software application turns the computers 102-108 into a specialized machine for achieving consensus of transferrable digital objects in the system 100. It should be noted that the specialized software application may include numerous components residing in different logical layers.

The networked nodes 102-108 are connected over a wide area network 122, such as the popular Internet, via their network interfaces (such as Ethernet or WiFi). The computer 102-108 access the network via the network interfaces. The system 100 may further include one or more centralized computer systems, such as the server system 132, for providing particular centralized services. For example, the server system 132 (such as a distributed server system, a server farm, or a cloud server) can be used to host the specialized consensus system software application for being downloaded by the nodes. The server system 132 is operatively coupled to and accessible over the Internet 122. The server system 132 can also host lists of peers that each node needs for its initial connection to the system 100. The server system 132 may also provide administrative functions for the system 100 and the users 110-116. The server system 132 is operatively coupled to a database 134 containing relevant data. The database 134 can be, for example, a relational database.

With the specialized consensus system software application running on the nodes 102-108, the system 100 achieves consensus between transferrable digital objects in the system 100 and overcomes the shortcomings of other systems. For example, as further discussed below, the system 100 provides solutions to the issue of PoW energy inefficiency, Market Failure of stake leasing, the Double Spend problem, the price volatility of digital tokens, and the challenge of funding on-going development of digital object tracking systems.

Figure 3:
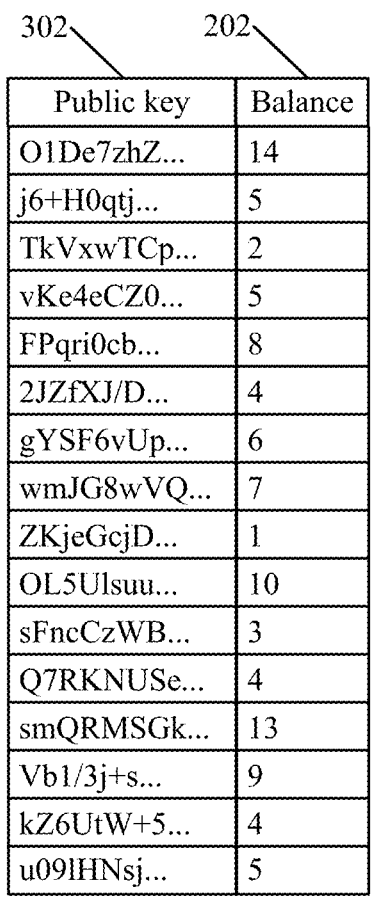
FIG. 3 is a simplified table depicting a ledger of public keys and corresponding stake in accordance with the teachings of this disclosure.
Figure 9:
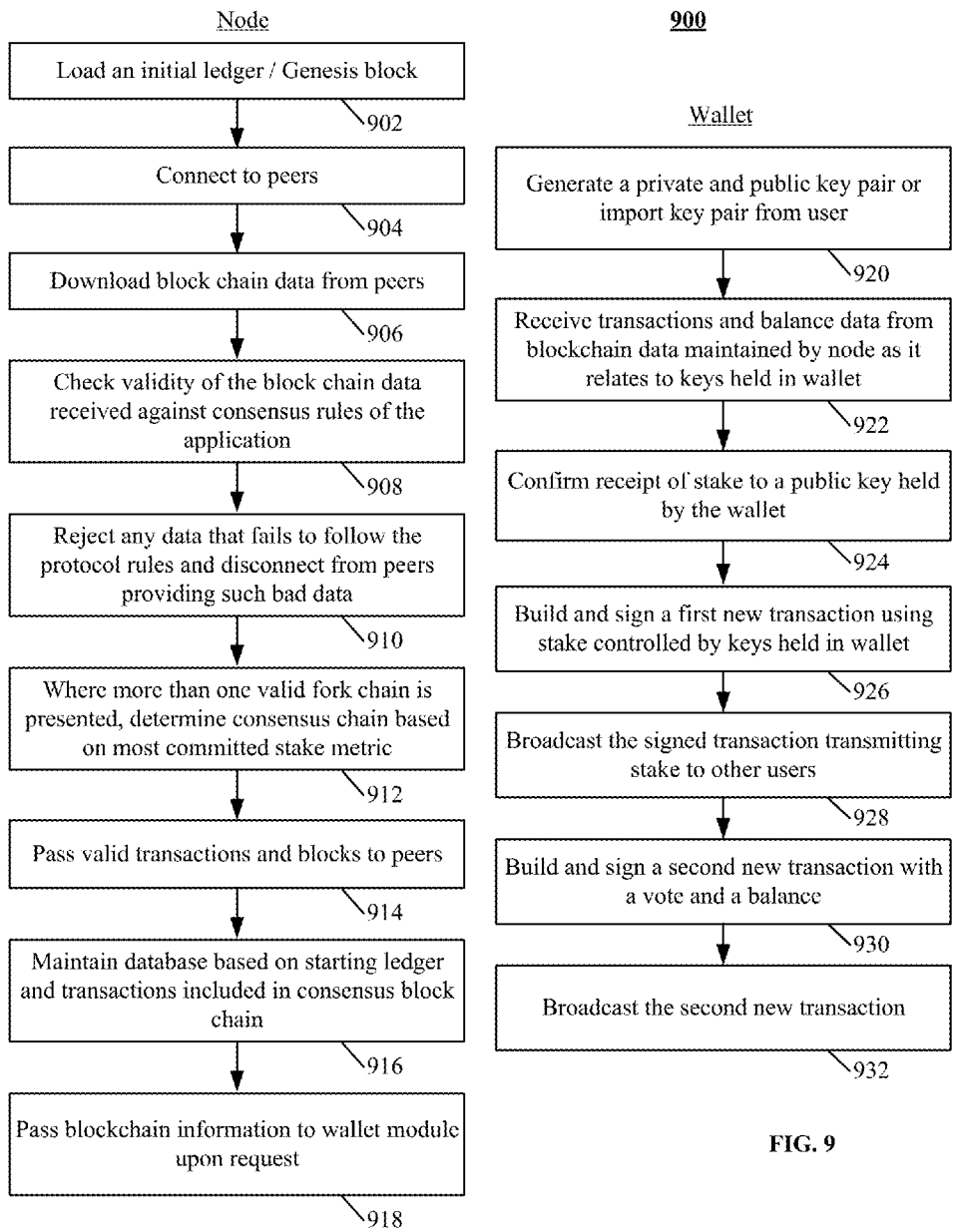
FIG. 9 is a simplified flowchart depicting a process by which a consensus system tracks digital objects in accordance with the teachings of this disclosure.

Referring to FIG. 9, a flowchart depicting a process by which a consensus system tracks digital objects is shown and generally indicated at 900. In one implementation, the consensus system software application includes two modules: node and wallet. The node and wallet modules perform different elements to carry out the functionality of the consensus system software application for the creation and tracking digital objects with consensus. The modules run concurrently on a node computer and may interface with each other. In the embodiment depicted, at 902 the node software loads a starting ledger of agreed upon balances tied to a corresponding list of agreed upon public key addresses. This is may be referred to as a genesis block. This starting ledger is typically a socially agreed to distribution of stake. The stake balances are for a fungible digital token. The public keys in the genesis block may be supplied by the initial users of the system 100 who generate key pairs offline to maintain the privacy of their corresponding private keys. Although the starting balances and associated public keys are auditable and known to all participants, each public key has an associated private key known only to its owner. The genesis block may also contain votes associated with balances such as for an initial set of block signers. A further depiction of a starting ledger is shown in tables 200 and 300 of FIGS. 2 and 3 respectively.

At 904 the node connects to peers. Lists of initial addresses (such as Internet Protocol addresses) of the peers may be included with the application, published on forums, or available on a public server. Lists of peer addresses are also subject to public audit and may change over time. For example, the list of addresses is downloaded from the server 132 provisioned by a trusted source. Once the node has connected to a group of peers, further peers can be discovered by requesting peers of the current connected peers and a list of these peer addresses can be maintained by the node.

At 906 the application downloads block chain data from peers. At 908 the application checks the validity of all block chain data received against the consensus rules of the application. This process includes verifying the cryptographic signatures of any transactions such as transactions transferring stake to a new public key. It also includes checking the cryptographic signatures of block signers and determining that a block signer has enough votes to be elected and has produced the block in the correct order. At 910 the application rejects any data that fails to follow the protocol rules. It does not pass this data on to other peers and it typically disconnects from the peer that provided bad data. It should be noted that the consensus system software application continuously performs the elements 906-910 to maintain up-to-date block chain data.

It is possible that more than one transaction history could be received by the node wherein the more than one transaction history is valid per protocol rules. However, the intent of the system 100 is to reach consensus among all honest peers on the same transaction history and it is therefore necessary to select a consensus history if more than one is presented. At 912 the application determines a consensus chain based on the metric: most committed stake. This metric will be further discussed in detail below. In one implementation, the user of the consensus software application will typically be warned when the application must choose between multiple valid transactions histories or fork chains. This is because the presence of a forked block chain can indicate an intentional attempt by other users to alter the transaction history for the purpose of double spending.

At 914, valid transactions and blocks are passed to peers on the network. At 916 the node application maintains and builds a database or databases that comprise the current ledger. The current ledger of balances is built by starting with the genesis block and applying each subsequent block of transactions that alter the ledger. An additional database can track current votes for block signers. At 918, information taken from the consensus transaction record can be passed by request to the wallet module of the consensus system software application.

The wallet module of the consensus system software application allows the user to interact with the consensus system and manage their digital assets. At 920 the wallet module generates a private and public key pair for the user. The user could then provide that public key to others as a receiving address for fund transfers over the network 122. If the user provided a public key that was included in the genesis block the user can import the corresponding private key into the wallet. At 922 the wallet queries the node module for current block chain data associated with the public keys in the wallet. At 924 the walled receives current balance information and any transaction records for the keys held in the wallet and displays this information to the user.

At 926 the wallet allows the user to build a first new transaction that references the stake associated with the public key controlled by the wallet and sign the first new transaction with the corresponding private key. The first new transaction transmits a stake to a different user. At 928 the wallet allows the user to broadcast the first new transactions to the network so that they may be added to and included in the consensus ledger. At 930 the wallet allows the user to build and sign a second new transaction, such as the transactions 212-227. The second new transaction includes one or more votes for one or more block signer candidates. The second new transaction is signed by the corresponding private key. At 932, the wallet module of consensus system software application broadcasts the second new transaction to connected peer node computers over the network 122.

Auditable Real-Time Multi-Vote System

Stake leasing and analogous voting methods for block signer selection result in Market Failure where individual stakeholder incentives are not aligned by the voting system with the interests of the stakeholder group as a whole. Block signers and stakeholders are users, such as the users 110-116, of the consensus system 100. The Market Failure issue can be addressed by providing balances with multiple simultaneous voting rights. This allows stakeholders to approve many candidate block signers with the full weight of the stakeholders' balances. Ranking block signers by highest stake weighted approval prioritizes block signers with broad trust and approval across the entire stake rather than prioritizing based on intensity of support. It also provides a simple interface for stakeholders as stakeholders need not choose a favorite block signer, rank block signers, or vote against block signers. Instead, they simply approve any block signers they trust and ignore the rest. Accordingly, the system 100 is also referred to herein as a multi vote digital stake system.

The voting mechanism is a continuous real-time stake weighted system that attaches multiple simultaneous voting rights to transferrable digital stake which are tracked in a peer to peer manner, where all voting and transactions are auditable in real time by all participants. Despite the many unique attributes of this system, the voting is in some respects analogous to the concept of "approval voting" as has been used in standard single time point elections. In a standard election, approval voting advantages voters with better access to information about the other voters' likely voting preferences (such as that set forth in the Fair Vote reference filed herewith). However, in the context of a continuous real time auditable consensus system, all stakeholders have complete access to information about how other stakeholders are voting and anyone can change a vote at any time. This allows the stakeholders to change votes accordingly if they choose, and allows the system to settle on an equilibrium voting state or adjust dynamically over time.

Standard approval voting for multiple winner elections lacks proportional representation. For example in the context of electing members to governing body who may be of different political parties approval voting would not provide proportional representation by party affiliation. Analogously, in the context of a consensus system, if 51% of the stake agreed on the block signers they like, those that control the other 49% of stake would not have a way to elect any different block signers. This is not a weakness for a consensus system. All consensus processes must eventually settle on one version of the record and all stakeholders are forced to come to agreement. Any disagreement is ultimately decided in a majority rules fashion by stake, so any coordinated majority controls the system anyway.

Despite the ability of a large coordinated faction to control voting outcomes, in practice there is likely to be a lot of overlap in the voting preferences of digital stake holders and little reason for breakdown into coordinated factions. Another important distinction of most digital consensus systems is that stake distribution is the function of an initial social agreement and owning stake is voluntary. There is little incentive for a 51% majority to coordinate against a minority because the minority owns stake by their own volition and can sell it at any time or support a different independent consensus. Owners of a single fungible token or stake are typically united in an interest to maintain the value of the underlying token or system. Allowing for multiple simultaneous voting rights allows stakeholders to find candidates with the broadest support and elucidate areas of agreement among stakeholders. For example, a block signer that is trusted by all stakeholders, even if not anyone's first choice, can be easily elected under a multi vote digital stake system.

A multi vote digital stake system allows a comparatively high bar to be set for support needed to be elected. In fact it is possible that with a particularly cohesive group of stakeholders all block signers could have over 50% support or some block signers could have almost unanimous support. In contrast, the average stake leased to each block signer in a leased stake system with 50 block signers would be at the very most 2%. This assumes 100% stake participation.

In a multi vote digital stake system, the bar to entry for block signers is higher. Whereas stake leasing systems allow substantial stakeholders to participate in block signing without additional votes or support from other stakeholders. The NXT protocol sets no bar to entry to participate in block signing. Although this may not be commonly viewed as a concern, the high bar to entry for block signers elected by a multi vote system is a useful property.

The high bar to entry for block signers in a multi vote digital stake consensus system can prevent behaviors like Vote Buying from taking hold. In contrast, with a low bar to entry, block signers participating in such behavior can easily begin participating in block signing and selectively sharing any profit only with supporters. With a high bar to entry, a candidate block signer would need to publically appeal for support from as many stakeholders as possible. A vote buyer would take a substantial risk to buy votes before they reached the threshold to get elected, as they may never get there. In such a case, the vote buyer would risk paying for nothing. In a multi vote system, there would more likely be nothing offered for votes unless or until a vote buyer is actually elected. Therefore, until that high threshold is reached, vote buyers can be rationally ignored by those who do not support the behavior.

Even if a vote buyer paid stakeholders for votes before being elected or successfully reaching a threshold to get elected, voting for this block signer to get a reward does not prevent a stakeholder from supporting other block signers. The vote buyer's behavior will likely be viewed in a negative light by a broad community of stakeholders as it is an attempt to selectively favor some stakeholders over others instead of supporting the system as a whole. Stakeholders in a multi vote digital stake system can rationally support candidates who are viewed as good for the community of stakeholders as a whole without added opportunity cost.

Ranking candidates by total approval is a good mechanism to determine a ranking of the most broadly trusted candidates. However, a mechanism to determine a cut-off (or cutoff) or an appropriate number of accepted block signers has to be utilized. An arbitrary number could be chosen as a cutoff. However, if this number were chosen too high, it may allow too many block signers with low approval and low trust to participate. Alternatively, if chosen too low it may not sufficiently diversify and decentralize control of the network and provide the redundancy desired by the stakeholders. Alternatively, a cut-off is chosen by percent support of stake. Using this metric alone makes it possible that no candidate is selected.

Alternatively, a stake weighted average of candidates selected in the voting process is used. Taking a stake weighted mean would allow the number of candidates to be skewed or manipulated by a small stake approving a very high number of candidates. Taking a stake weighted median may be preferable over a mean but can still lead to less than ideal results. To take a rather extreme example, it can be imagined that 45% of the stake agrees on the same 5 candidates and only selects them but the other stakeholders all select a very high number of candidates with very little agreement in addition to those 5 candidates. This would result in the median number of candidates being very high. The 5 candidates that have almost universal approval could be chosen along with a very long list of candidates who have extremely low approval making the bar to entry lower than desired. This scenario illustrates that a stake weighted median is a less than ideal algorithm. Another option would be to have stakeholders separately vote on a desired number of candidates, this might yield reasonable results in some cases but requires an additional step and additional complexity for voters.

In accordance with the present teachings, an appropriate number of block signers is determined based on an analysis of stakeholder approval votes. When a stakeholder selects block signers, the stakeholder is said to be approving each of her chosen block signers to sign a proportional share of the blocks based on the number of candidates selected. For instance, if the stakeholder approves five candidates, then the stakeholder is indicating that she approves each candidate to sign up to 20% of the blocks. In such a case, 20% (or 0.20) is referred to herein as approval width of the stakeholder's stake. In contrast, the total stake that a block signer is approved by is termed herein as approval height. Approval therefore happens in two dimensions. A block signer could have an approval height of 50% if 50% of the stake votes for the block signer. The approval width and approval height are further illustrated by reference to FIG. 2.

Referring to FIG. 2, a table depicting approval width and approval height of a set of blocker signer candidates is shown and generally indicated at 200. The data of the table 200 is part of the current ledger of the consensus system 100. The table 200 includes a balance column 202, a candidates selected number column 204, an approval width column 206, a block signer candidate votes column 208, and a block signer candidate summed approval column 210. The table 200 further includes sixteen stakes 212-227 having the balances of 14, 5, 2, 5, 8, 4, 6, 7, 1, 10, 3, 4, 13, 9, 4 and 5 respectively. The balances 212-227, belonging to various stake holders, are listed in the column 202. Each stakeholder is associated with, for example, a public key. A public key identifies a stakeholder and is used to receive transferred stake and allow sending stake via a signature of its corresponding private key. The public keys are shown in a column 302 of a table 300 in FIG. 3. The table 300 can be viewed as part of the table 200. The column 204 indicates the number of candidates voted for by the corresponding stake.

Taking the stake 212 as an example, 4 candidates are selected to sign the blocks. Accordingly, the approval width of the stake 212 is 0.25 which is indicated in the column 206. The four selected candidates are candidates #2, #3, #6 and #7 as shown in the column 208. Each selected candidate is indicated with a check mark. As an additional example, the stake 227 has an approval width of 1 with only one candidate (i.e., candidate #7) selected. As still a further example, the stake 218 has an approval width of 0.33 (meaning one third) with 3 candidates (i.e., candidates #4, #5 and #7) selected. The stakes 212-227 are ordered based on the corresponding approval widths from the lowest to the highest.

For each candidate of the illustrative candidates #1-#7, a summed approval is indicated in columns 210. For example, candidate 2 is selected by the stakes 212, 215 and 220. In such a case, the summed approval for candidate 2 is the sum of the stakes 212, 215 and 220 which is calculated as 14+5+1=20. The summed approval for candidate 2 is indicated at 232. As an additional example, candidate 7 is selected by the stakes 212, 213, 214, 216, 218, 219, 223, 224 and 227. In such a case, the summed approval for candidate 7 is the sum of the stakes 212, 213, 214, 216, 218, 219, 223, 224 and 227 which is calculated as 14+5+2+8+6+7+4+13+5=64. The summed approval for candidate 7 is indicated at 234.

The summed approval and intermediary approvals for each candidate are indicated at the columns 242, 244, 246, 248, 250, 252 and 254 respectively. The summed approval is a special case of intermediary approval. In other words, the summed approval is the last intermediary approval for each candidate. The summed approval and intermediary approvals for each candidate are determined from bottom up (meaning from highest approval width to lowest approval width), and can be calculated using Formula A below:

$$SA_{mk} = \Sigma_{i=1}^{K} V_{mi} * B_i$$

$SA_{mk}$ is the intermediary approval for the $m_{th}$ candidate at the level k. m is 1, 2, 3, 4, 5, 6, or 7 in the example above. k ranges from 1 to 16 with 1 corresponding to the row 227, and 16 corresponding to the row 212. i is an integer ranges from 1 to k. $V_{mi}$ is the $i_{th}$ vote for the candidate m. It has value 1 when it corresponds to a check mark in the table 200. Otherwise, its value is 0. For example, in the row 227, there is a check mark for the candidate 7. Therefore, $V_{71}=1$. Similarly, $V_{72}=0, V_{73}=0, V_{74}=1, V_{75}=1, V_{76}=0$, etc. $B_i$ is the $i_{th}$ balance. For example, $B_1=5, B_2=4, \ldots, B_{16}=14$. Taking candidate #7 as an example, its intermediary approvals are 5, 5, 5, 18, 22, . . . , 50, and 64.

The balances 202 are also referred to as approving balances. The approving balances 225, 226 and 227 each have an approval width of 1. Accordingly, they are said to have the widest approval. In contrast, the approving balances 212-216 are said to have the thinnest approval with an approval width of 0.25. The total balance of the stakes 212-227 is 100. Accordingly, the candidates #1-#7 are said to have approval heights of 4%, 20%, 29%, 54%, 31%, 66% and 64% respectively. The approval heights of the candidates #1-#7 are 4, 20, 29, 54, 31, 66 and 64 respectively.

To select the block signer candidates that are accepted to be allowed to sign blocks, the candidate with the highest approval height is first selected. According to the illustrative table 200, candidate #6 has to most approval (meaning highest approval height) is automatically selected since she has the highest approval height at 66. Next, the candidate with the next highest approval height is examined. In the present example, candidate #7 has the second highest approval height (i.e., 64), and is thus examined after candidate #6 is selected. To do so, the approval width of candidate #6 at the height of 64 (i.e., the summed approval of candidate #7) is determined based on the table 200. Looking at the column 252, approval height 64 is above the intermediary approval 52 that is the highest approval height that is same as or lower than the approval height 64. Accordingly, the approval width in the cell of row 213 and column 206 is selected. This selected approval width is termed herein as a mapped approval width of the candidate #7 relative to candidate #6. The mapped approval width is less than 1. In the illustrative embodiment, 1 is the candidate selection threshold. Therefore, candidate #7 is selected.

To continue the search for block signers, the candidate with the third highest approval height, which is 54 of candidate #4, is then examined. The mapped approval width of the candidate #4 relative to candidate #6 is 0.25. Similarly, the mapped approval width of the candidate #4 relative to candidate #7 is 0.25. Regarding candidate #4, the sum of mapped approval widths is 0.25+0.25=0.5, which is less than 1. Therefore, candidate #4 is selected as well.

Next, the candidate with the fourth highest approval height, which is 31 of candidate #5, is then examined. The mapped approval width of the candidate #5 relative to candidate #6 is 0.33, because 30 is the highest intermediary approval height of candidate #6 that is same as or below 31. At the intermediary approval height of 30, the lowest approval width is ⅓ (meaning one third) indicated in the cell of row 218 and column 206. Similarly, the mapped approval width of the candidate #5 relative to candidate #7 is ⅓; and the mapped approval width of the candidate #5 relative to candidate #4 is ⅓. Regarding candidate #5, the sum of mapped approval widths is ⅓+⅓+⅓=1, which is same as the predetermined candidate threshold. Therefore, candidate #5 is not selected. Any candidate with a lower approval height than candidate #5, the first cutoff candidate, is not selected either.

The Computer Program Listing A listed at end of the Detailed Description section of the present patent application illustrates one of multiple ways to perform the calculation described above. The selection of candidates #4, #6 and #7 is performed by the consensus system software application running on each various nodes of the system 100. The selection process described above is further illustrated by reference to FIG. 11. The selection of block signers for signing blocks of the system 100 is also referred to herein as election of block signers.

The set of elected block signers can be determined by the previously described method at the point of any block in a block chain. Generally, elected block signers will each sign a single block within a round. At the point of the last block in the round the calculation of new elected block signers will be repeated/updated to include any new votes included in blocks in that round, so as to determine the set of elected block signers that will participate in the next round. The order of block signers within a round is also performed in a deterministic way such that block signers sign blocks in a defined order that is expected by all participants. Each block signer is given a defined amount of time to produce a block or otherwise can be skipped by the next block signer in the order. This order could be chosen in any number of ways such as ordered by approval height. The order could also be pseudo-randomized using the method described above.

Figure 11:
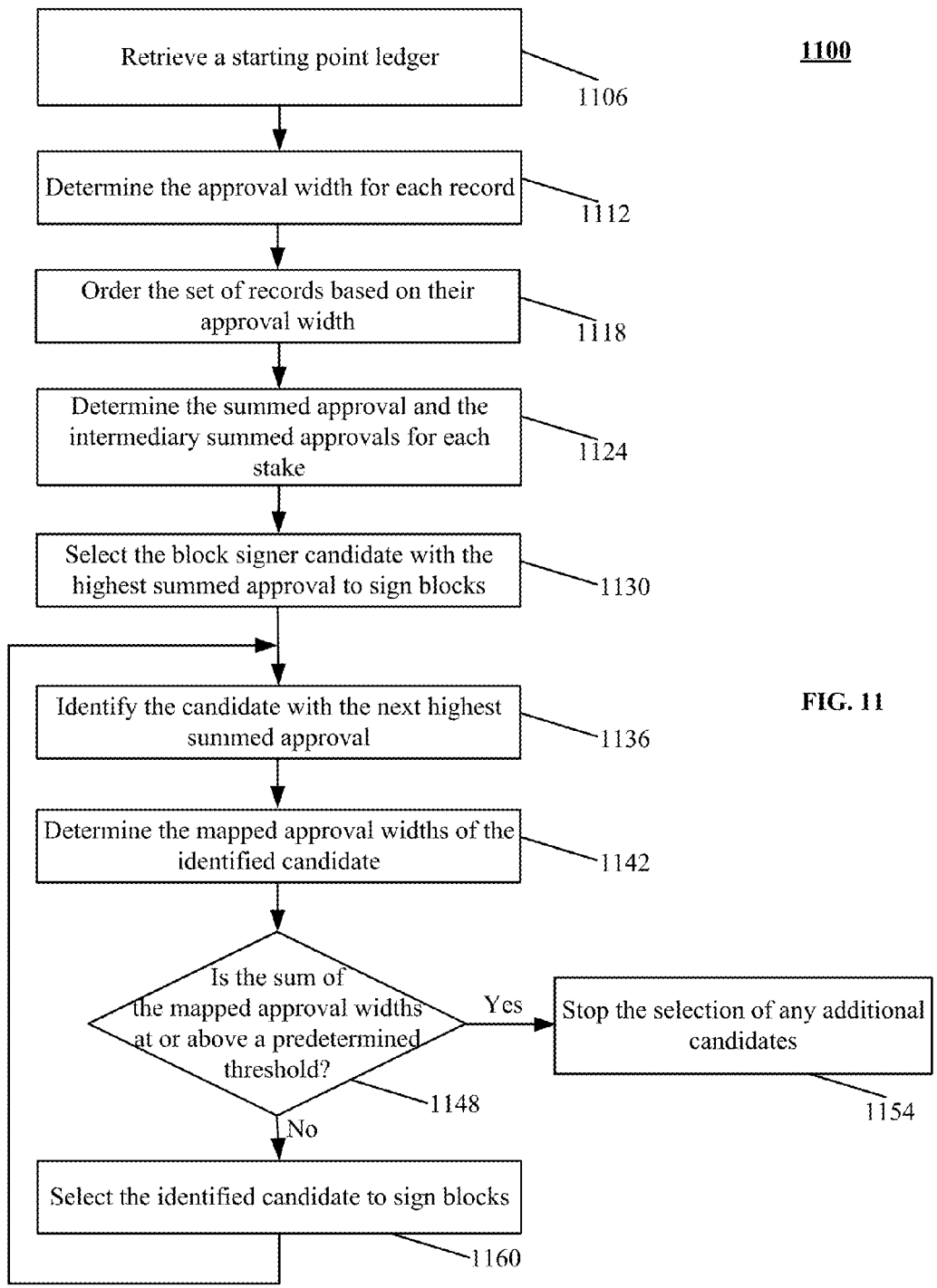
FIG. 11 is a flowchart depicting a process by which nodes of a consensus system each select block signers to sign blocks in accordance with the teachings of this disclosure.

Referring to FIG. 11, a flowchart depicting a process by which nodes (such as the nodes 102-108) of the system 100 each select block signers to sign blocks is shown and generally indicated at 1100. In one implementation, the process 1100 is performed by the consensus system software application. At 1106, the software application builds a database of records from transactions included in the blockchain where the records indicate stakes of a set of stakeholders and voting data of the stakes. For example, the stakes 212-227 are the retrieved stakes; and the voting data of the stakes are indicated by the check marks in the table 200. The voting data indicates the candidates selected for the different stakes. Additional data can also be retrieved at 1106. For example, the additional data includes the number of candidates selected for each stake, such as that indicated in the column 204 of the table 200. The retrieved records are also referred to herein as a current ledger, which also includes a list of public keys and associated stakes controlled by the public keys, and a list of votes for block signer candidates.

At 1112, the software application determines the approval width (such as that indicated in the column 206 of the table 200) of each retrieved stake. At 1118, the software application orders the set of records based on their approval width. For example, they are ordered from the smallest to the largest as shown from the row 227 to the row 212. At 1124, the software application determines the summed approval and the intermediary approvals for each candidate. For example, such approvals are indicated at 242-254 of the table 200. At 1130, the software application selects the candidate (such as the candidate #6 in the table 200) with the highest approval (meaning the highest summed approval) from the candidates. At 1136, the software application identifies the candidate with the next highest summed approval (such as the candidate #7). At 1142, the software application determines the mapped approval widths of the identified candidate.

At 1148, the software application checks whether the sum of the mapped approval widths is at or above a predetermined threshold (such as 1 or 100%). If so, at 1154, the software application stops the selection of any additional candidates for signing blocks. Otherwise, at 1160, the software application selects the identified candidate to sign blocks. After the selection, the software application executes the element 1136 again in looping manner to select additional block signer candidates for signing blocks. The elected block signers, such as candidates #6, #7 and #4, are also referred to herein as accepted block signers.

Fork Resolution

A block chain is constructed as a series of groups of transactions called blocks where each block cryptographically references the prior block. A fork is a situation where more than one valid block is propagated that builds off a single block. For example, a fork is created when more than one block signer adds a block to the same precursor block. Each block that builds off the same precursor block might contain different or conflicting transactions preventing clarity about the current ledger of balances. Each block that builds off the same precursor block might be extended independently with additional blocks. An illustrative fork is further illustrated by reference to FIG. 4.

Figure 4:
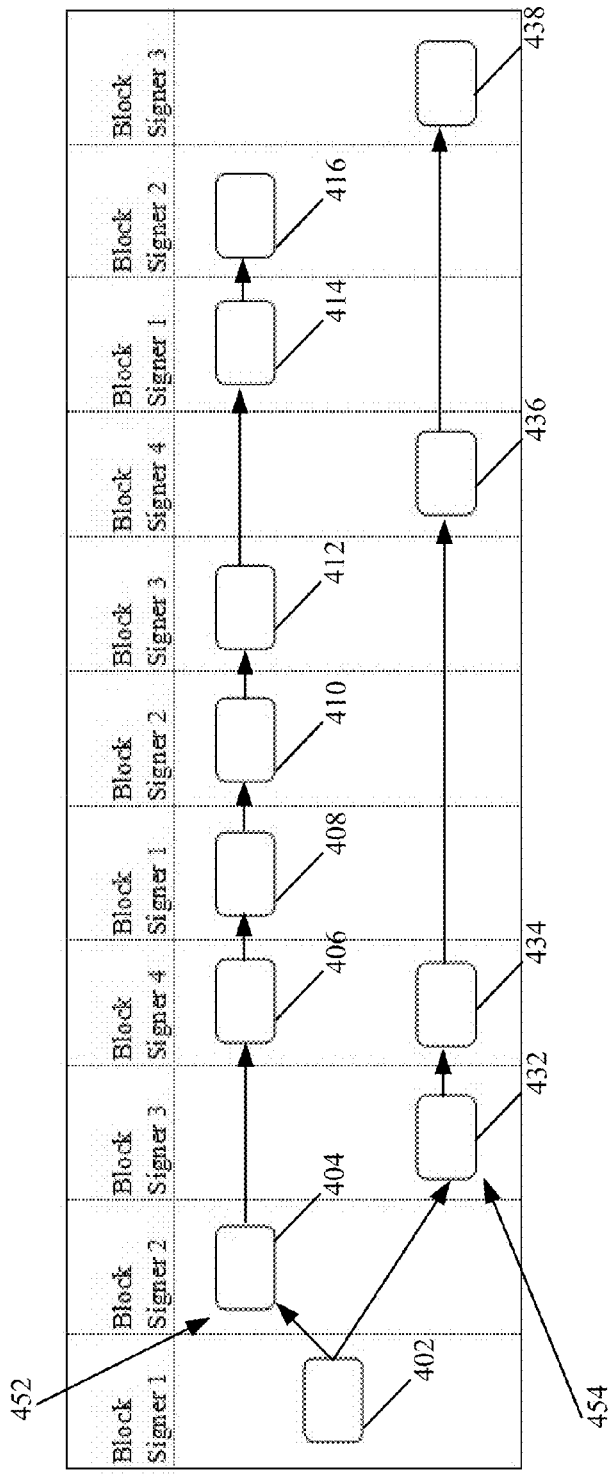
FIG. 4 is simplified diagram depicting a fork in a block chain in accordance with the teachings of this disclosure.

Referring to FIG. 4, a simplified diagram depicting a fork is shown and generally indicated at 400. The first fork chain 452 includes blocks 404, 406, 408, 410, 412, 414 and 416, while the second fork chain 454 includes blocks 432, 434, 436 and 438. Both fork chains are propagated from the single block 402. It should be noted that the block signer 1 signed blocks 402, 408 and 414; the block signer 2 signed blocks 404, 410 and 416; the block signer 3 signed blocks 432, 412 and 438; and the block signer 4 signed blocks 406, 434 and 436. The block chains 452 and 454 are also referred to herein as forks.

Forks in a block chain can happen for a few reasons. These include network delays in propagating a block, software bugs, and importantly intentional attempts to manipulate the consensus ledger. Network propagation related forks are common for consensus mechanisms that involve randomized methods of block production. This includes both PoW consensus and PoS consensus mechanisms that rely on finding a valid hash that meets the difficulty threshold for a block solution. It cannot be predicted when a valid solution will be found so it is always possible that more than one solution can be found at approximately the same time. If a group of elected and trusted block signers produce blocks on a fixed schedule or in a defined order (giving each block signer time to produce a block), network related forks can be all but eliminated. A method to closely synchronize clocks of participants and block signers, such as using Network Time Protocol ("NTP"), can further prevent network latency related forks. The use of atomic clocks is another example of a clock synchronization method.

Forks that are the result of an intentional attempt to rewrite the accepted consensus ledger must be resolved with carefully considered rules. Given that network related forks can be all but eliminated by using a fixed block production schedule, when forks happen it can be treated as an attempt to manipulate the system 100 and a betrayal of trust by either a trusted block signer or large stakeholder. These forks can be handled with carefully considered rules that allow a majority of honest stakeholders to maintain control of the consensus record. If stakeholders carefully choose and vote in trustworthy block signers these forks may never occur. However, the system 100 needs to handle such cases and dissuade attempts to manipulate the ledger.

Block chain consensus algorithms use metrics to determine the correct chain when presented with more than one fork chain. Bitcoin defines the correct chain as the chain with the most PoW. This is often just called the longest chain because under most circumstances the longest chain with the most blocks would also include the most PoW. The correct chain is therefore often called the longest chain because it typically corresponds to the chain with the most blocks. NXT and Peercoin PoS systems use analogous correct chain metrics that correlate to cumulative difficulty and length of the block chain. DPOS also uses the longest valid chain as the metric for the correct chain in the event of a fork. Using longest chain as a metric for deciding between fork chains opens a system to manipulation if a longer chain can be created with malicious intent. For example, in DPOS using the longest chain metric can potentially allow 51% of block signers to collude to control the ledger.

A better method of fork resolution is proposed. The method of fork resolution utilizes a primary metric for determining correct chain called most committed stake. The fork chain with the most committed stake will also be referred to herein as the widest chain. In addition to the widest chain metric for correct chain determination the system relies on two additional tools for fork resolution which are used under some circumstances: ignoring fork chains and merging fork chains.

Figure 10A:
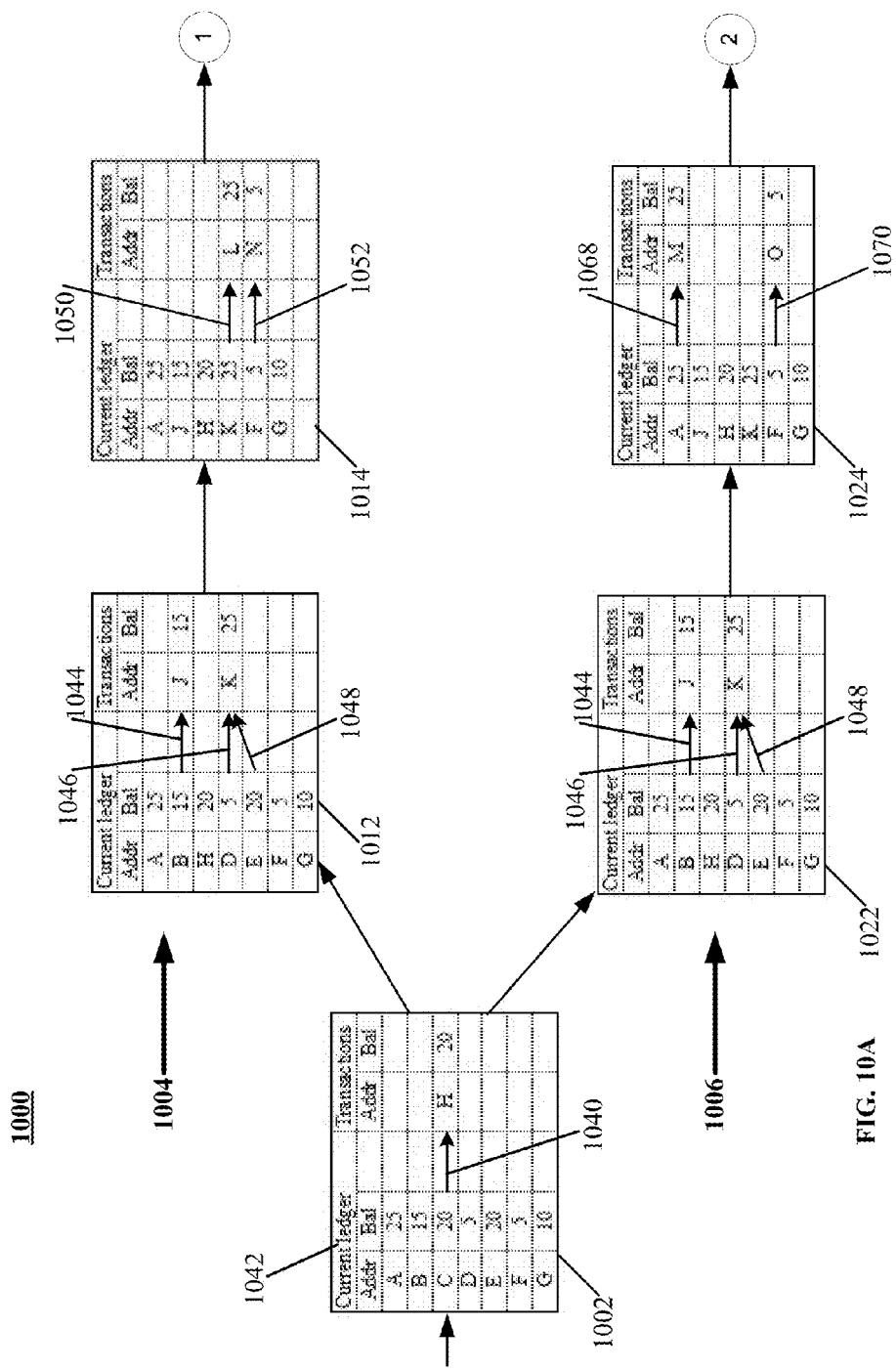
FIG. 10A is a simplified diagram depicting a fork with two fork chains and a method for determining the fork chain with the most committed stake and merging the fork chains in accordance with the teachings of this disclosure.
Figure 10B:
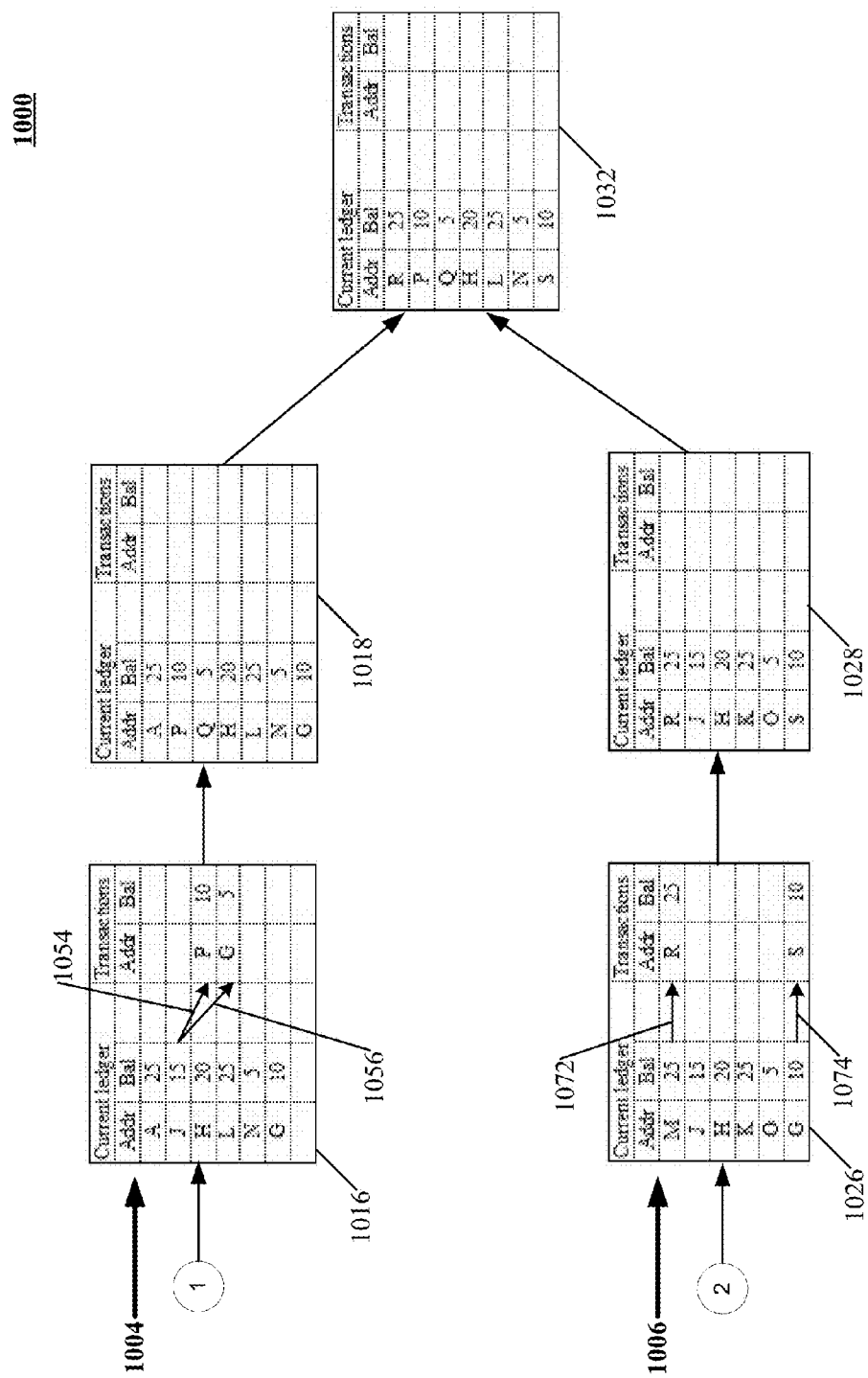
FIG. 10B is a simplified diagram depicting a fork with two fork chains and a method for determining the fork chain with the most committed stake and merging the fork chains in accordance with the teachings of this disclosure in accordance with the teachings of this disclosure.

The widest chain is further illustrated by reference to FIGS. 10A and 10B. Referring now to FIGS. 10A and 10B, a simplified block diagram depicting a fork with two fork chains and a method for determining the widest chain are shown and generally indicated at 1000. Two fork chains 1004 and 1006 are propagated from the same block 1002. The fork chain 1004 includes blocks 1012, 1014, 1016 and 1018, while the fork chain 1006 includes blocks 1022, 1024, 1026 and 1028. The fork chains 1004 and 1006 merge at the block 1032.

Each block may include one or more transactions. For example, the transactions inside the block 1014 are indicated at 1050 and 1052. Each transaction has one or more transaction inputs and one or more transaction outputs. For example, the block 1002 includes a transaction 1040 that spends the balance of output C (20) and sends it to a new output H. Each transaction input corresponds to an output of a prior transaction or a balance from the genesis block of the system. Each output of a transaction may be referenced and used as an input in a following transaction. Once an output has been used as an input or "spent" in a transaction it may not be spent again by any other transaction. Transaction fees are not depicted for the purpose of simplification.

A summary of the current ledger at the point of each block is shown within each block for illustrative purpose only. For example, the current ledger leading to block 1002 is shown at 1042. The current ledger is not actually included in each block but is rather independently constructed by each node running the consensus system software application based on the combined transactions of the block chain.

The block 1002 includes a transaction 1040 that spends the balance of output C (20) and sends it to a new output H. In the block 1012, the transactions include a transaction 1044 from B to J for a balance of 15, a transaction 1046 from D & E to K for a total balance of 25 (note that 1046 and 1048 are a single transaction). In the block 1014, the transactions include a transaction 1050 from K to L for a balance of 25, and a transaction 1052 from F to N for a balance of 5. In the block 1016, the transactions include a transaction 1054 from J to P & G for a total balance of 15 (note that 1054 and 1056 are a single transaction). In the block 1022, the transactions include a transaction 1062 from B to J for a balance of 15, a transaction 1046 from D & E to K for a total balance of 25. In the block 1024, the transactions include a transaction 1068 from A to M for a balance of 25, and a transaction 1070 from F to 0 for a balance of 5. In the block 1026, the transactions include a transaction 1072 from M to R for a balance of 25, and a transaction 1074 from G to S for a balance of 10.

A fork chain with the most committed stake can be determined by comparing any two fork chains such as 1004 and 1006. Common balances are balances present in the block chain history of both fork chains. For example, all the balances shown in block 1002 are common to both fork chains 1004 and 1006 because block 1002 is shared by both fork chains. The balance at output J(15) can also be considered a common balance because the transaction 1044 from B to J is present on both fork chains. In another implementation, only balances that are present in blocks before the point of the fork are considered common balances. When comparing two fork chains, such as 1004 and 1006, the committed stake of a first chain 1004 is the sum of common balances which are subsequently used or spent in a transaction unique to fork chain 1004; and the committed stake of a second fork chain 1006 is the sum of the common balances which are subsequently used or spent in a transaction unique to fork chain 1006.

For example, any stake taken from an output shared by both fork chains (such as output A) that is spent in a transaction unique to one fork chain (such as transaction 1068) counts toward the total committed stake of that fork chain (1006). When more than two fork chains are present the widest fork chain can be determined by comparing the fork chains pairwise and eliminating the less wide fork chain until the widest fork chain is found. The widest chain metric has the property that if fork chain A is wider than fork chain B and fork chain B is wider than fork chain C, then fork chain A will be wider than fork chain C. This metric also favors the fork chain with the most complete transaction history that is inclusive of all valid transactions.

The transactions 1050, 1052 and 1054 are unique to the fork chain 1004. Each of these transactions spends stake from outputs common to both fork chains in transactions that are unique to fork chain 1004 and are thus counted in computing the committed stake of the fork chain 1004. In such a case, the committed stake of the fork chain 1004 is 45, which is the sum of 25, 5, and 15 of the transactions 1050, 1052, and 1054 respectively.

For the fork chain 1006, the transactions 1068, 1070, 1072, and 1074 are unique transactions. However, transaction 1072 spends stake from output M which is not shared by both fork chains. The stake taken from output M is not taken from an output shared by both fork chains and thus the transaction 1072 is not counted as adding to the committed stake of the fork chain 1006. This stake at output M was already committed to the fork chain 1006 in the transaction 1068. Including this same stake in additional transactions will not add to the width of fork chain 1006. Accordingly, the committed stake of the fork chain 1006 is 40, which is the sum of transactions 1068, 1070, and 1074: 25, 5, and 10.

Since the committed stake (i.e., 45) of the fork chain 1004 is bigger than that (i.e., 40) of the fork chain 1006, the fork chain 1004 is thus the widest chain. The committed stake of the fork chain 1004 is termed herein as the most committed stake. The balance of 5 of the output F is double spent due to the transactions 1052 and 1070. Because the fork chain 1004 is the widest chain, it is considered the correct chain and this chain will take precedence when disambiguating conflicting transactions if the chains are merged. The transaction 1070 of the fork chain 1006 is therefore ignored in the merged block 1032. In other words, the widest chain approach successfully disambiguates a Double Spend. As used herein, the transaction 1070 is termed as a double spent transaction. To merge the fork chains 1004 and 1006 and derive the block 1032, the unique transactions 1050, 1052, 1054, 1068, 1072 and 1074 are accepted and counted. The transaction 1070 is not accepted. In addition, the transactions 1044 and 1046 are accepted as well, but counted only once. It should be noted that 1046 and 1048 are a single transaction that combines two inputs into one output. Similarly, 1054 and 1056 are a single transaction that combines two inputs into one output. As used herein, the fork chains 1004 and 1006 are said to be merged into the widest chain.

Using the widest chain metric for correct chain combined with fork merging allows a single block signer to prevent transactions from being censored even by the combined effort of all other elected block signers. Fork merging is carried out by block signers in lieu of switching to a new fork chain. When a block signer recognizes a wider valid fork chain than the fork chain they are currently producing blocks on, rather than simply switching to the wider fork chain, the protocol rules stipulate that the block signer merges the fork chains by creating a block that references the head blocks of both precursor fork chains. Fork merging accomplishes a number of objectives. It allows for a more complete history of block production to be preserved. It allows that block signers need never sign a block unless it references every prior block they have signed. It can eliminate abandoned fork chains/blocks that are otherwise never referenced in the consensus chain. Additionally it facilitates detection and prevention of censorship.

If a block signer is intentionally ignored by the other block signers who are attempting to censor transactions within her blocks, this block signer can eventually build a wider fork chain that offers the most complete transaction history without cooperation from other block signers. This process is facilitated by fork merging because the block signer need not abandon her prior blocks but can rather merge them with a chain built by other block signers to generate a complete and accurate history of block production.

Figure 5:
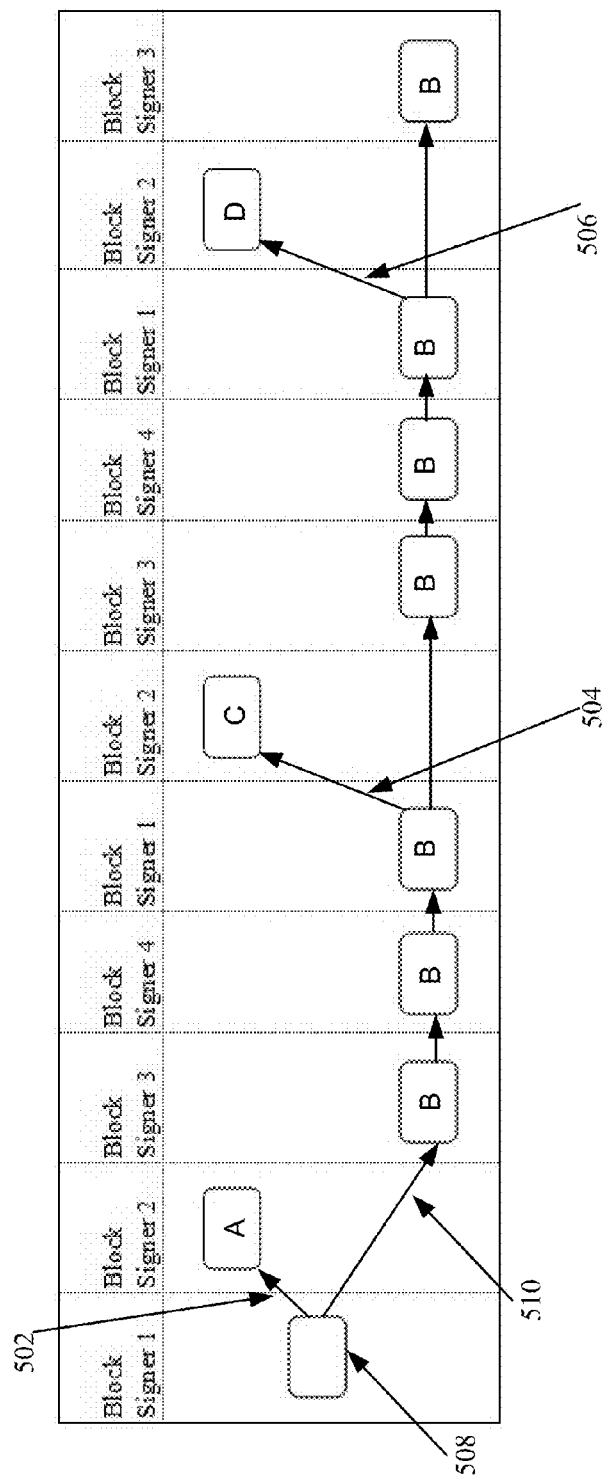
FIG. 5 is simplified diagram depicting a fork and censorship in accordance with the teachings of this disclosure.

The censorship is further illustrated by reference to FIGS. 5 and 6. FIG. 5 illustrates a consensus protocol that uses a "longest chain" metric for fork resolution and lacks fork merging. FIG. 5 shows fork chains 502, 504, 506, and 510. All blocks in fork chain 510 are denoted with a "B". Fork chain 510 is built by block signers 1, 3 and 4 who intentionally ignore/censor any blocks produced by block signer 2. Fork chain 510 does not include any blocks produced by block signer 2. Block signer 2 continues to switch to the longer chain and only ever produces a fork chain of size 1 block. In this case, fork chain 510 is the consensus chain and block signers 1, 3, and 4 are successful at achieving censorship by eliminating blocks produced by block signer 2 from the consensus chain.

Figure 6:
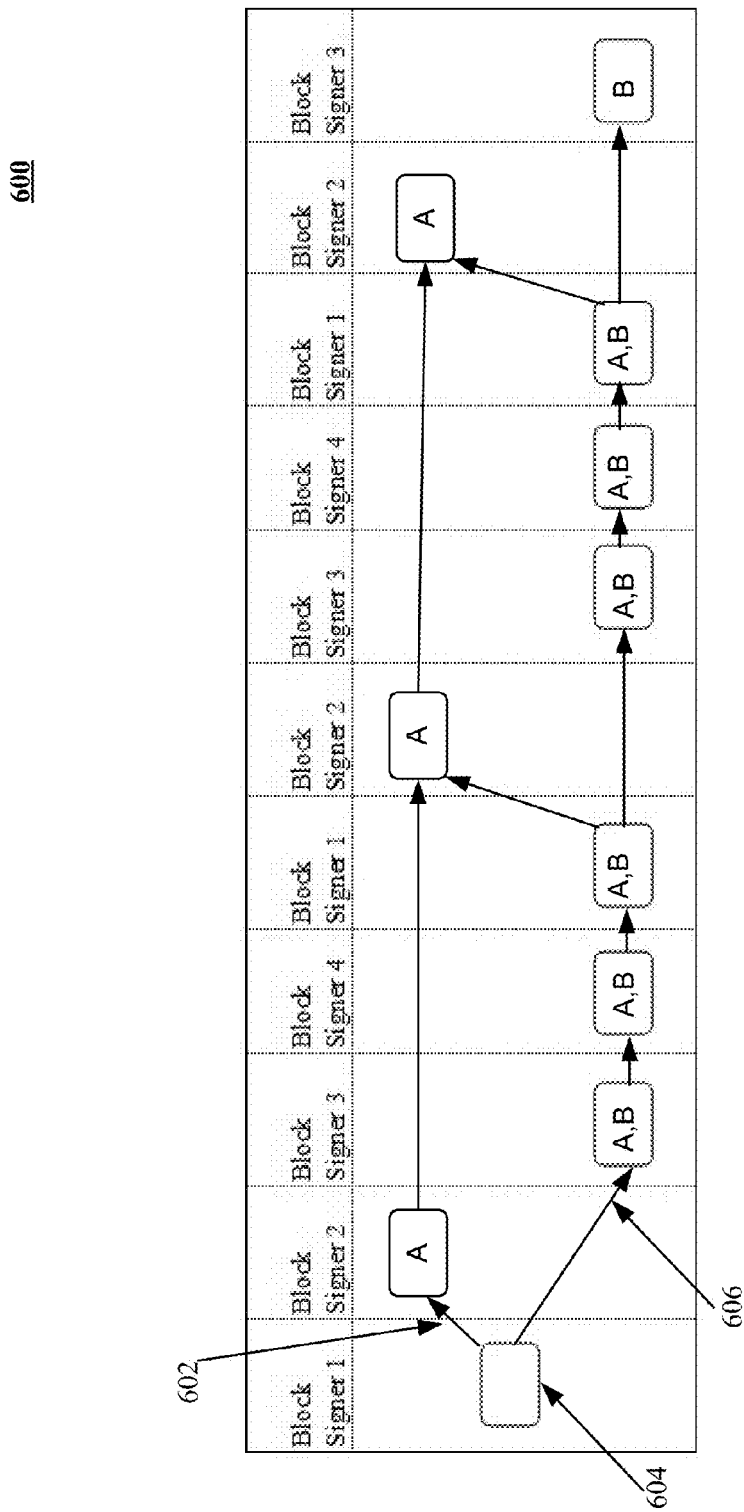
FIG. 6 is simplified diagram depicting censorship prevention in accordance with the teachings of this disclosure.

FIG. 6 shows the improved consensus model using fork merging and widest chain metric. FIG. 6 shows two fork chains 602 and 606 which share a precursor block 604. All blocks in fork chain 606 are denoted with a "B". All blocks in fork chain 602 are denoted with an "A". Blocks that are included in both fork chains are denoted "A, B". Despite the fact that fork chain 602 merges in blocks from fork chain 606, block 604 remains the point of the fork for the purpose of comparing fork chains 602 and 606 to determine a widest chain. Fork chain 606 is built by block signers 1, 3 and 4 who intentionally ignore/censor any blocks produced by block signer 2. Fork chain 606 does not include any blocks produced by block signer 2. Despite being created by only one block signer, fork chain 602 can become the widest fork chain because it can include (through merging) all transactions on both chains. Rather than abandon her previous blocks, block signer 2 can build upon both chains to create the consensus chain.

The widest chain metric allows all stakes to participate in a fork resolution and the resolution ultimately occurs via majority vote of stake. Participants vote for fork chains largely automatically via transactions. Transactions must include a hash of a recent block from the consensus chain as known to the creator of the transaction. When there is a fork, transactions created by participants will reference a recent block on the widest fork chain. These transactions cannot be included in a different fork chain because they are only valid on the fork chain that they reference. These transactions will add to the width of the already widest fork chain and thereby further resolve the fork to a single consensus chain.

Correct chain metrics are intended to help prevent the replacement or alteration of a publically known consensus chain. Correct chain metrics are most useful if they provide strong evidence that a particular chain was known to all participants and was the public consensus chain at the time it was built. PoW accomplishes this by the idea that the most PoW can be performed by a cooperative process of all participants. The widest chain metric accomplishes this goal because the most committed stake results when stakeholders throughout the network cooperatively commit stake to the public consensus chain. A chain with a lot of committed stake is therefore likely to have been known to all participants as it was constructed. There are situations however when additional evidence can indicate if a chain was the public consensus chain at the time of its creation. This additional evidence can also be used by the consensus software application and by stakeholders generally to prevent revision of the public ledger. When such evidence exists that a chain was not in fact known to all participants at the time of its creation (also called a hidden chain) it can be ignored or otherwise not chosen as the consensus chain. The two types of evidence that we will consider are: Double Chain Signing and Direct Network Observation.

Double chain signing occurs when a block signer has signed on more than one fork chain without referencing both chains via a merge function. This behavior violates protocol rules and it is therefore assumed that a block signer who has done this has done so with the intention of creating a hidden chain. When comparing two chains a node can see if block signers have followed the merge rule or have signed independent chains.

Double chain signing is further illustrated by reference to FIG. 4 and FIG. 7. FIG. 4 shows two fork chains 452 and 454. When deciding between these two fork chains to determine the correct chain the consensus software application can use evidence of double chain signing to make a determination. The first fork block chain 452 includes blocks 404, 406, 408, 410, 412, 414 and 416, while the second fork block chain 454 includes blocks 432, 434, 436 and 438. Both fork chains are propagated from block 402. It should be noted that the block signer 1 signed blocks 402, 408 and 414 which are all on the same fork chain 452. The block signer 2 signed blocks 404, 410 and 416; which are all on the same fork chain 452.

The block signer 3 signed block 412 on fork chain 452 and signed blocks 432 and 438 on fork chain 454. Block signer 4 signed block 406 on fork chain 452 and signed blocks 434 and 436 on fork chain 454. Block signer 3 and 4 have defied protocol rules by double chain signing. These block signers are therefore assumed by the protocol to have done this for the purpose of creating a hidden chain. Fork chain 454 is created entirely by block signers who can be seen to have double signed chains it is therefore automatically rejected in favor of fork chain 452 as the correct chain. Although block signers 3 and 4 signed some blocks on fork chain 452 these blocks were subsequently acknowledged and built upon by block signers 1 and 2 who were following protocol rules. This chain can therefore be trusted and is assumed to be a chain that was not hidden. Fork chain 452 is selected as the consensus chain in this example.

Figure 7:
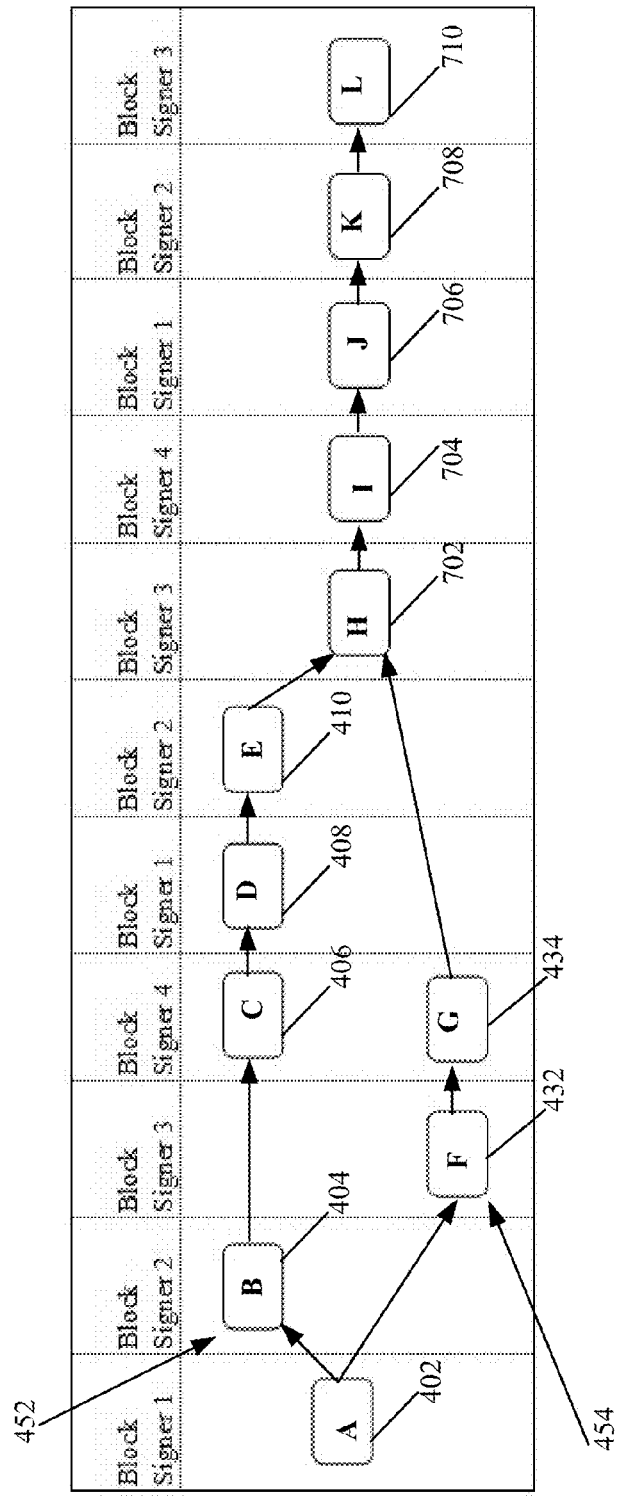
FIG. 7 is simplified diagram depicting a fork merging process in accordance with the teachings of this disclosure.

Double chain signing is also seen in FIG. 7. FIG. 7 depicts the same initial fork as FIG. 4. Block signer 3 produces the first block of fork chain 454. Block signer 4 follows by double chain signing both fork chain 452 and 454. Fork chain 452 is extended by block signers 1 and 2 with blocks 408 and 410. At the point of block 410 we assume that fork chain 452 is a wider chain. Rather than simply switching to produce a block that builds off the wider chain, block signer 3 follows protocol and merges the two chains with block 702. Block signer 4 double chain signed when producing blocks 406 and 434 on independent fork chains. When determining the widest chain between fork chains 452 and 454 at the merge block 702 any transactions in block 434 will not count toward the committed stake of the fork chain because block 434 was produced by block signer 4 who did not follow protocol rules and is therefore not trusted. Any transactions included in block 406 will count toward the committed stake of fork chain 452 because although this block was produced by block signer 4 who did not follow protocol rules it was subsequently built upon and confirmed by block signers 1 and 2 who were following protocol rules. It is therefore assumed that block 406 was made available to the network at the time it was produced.

Figure 8:
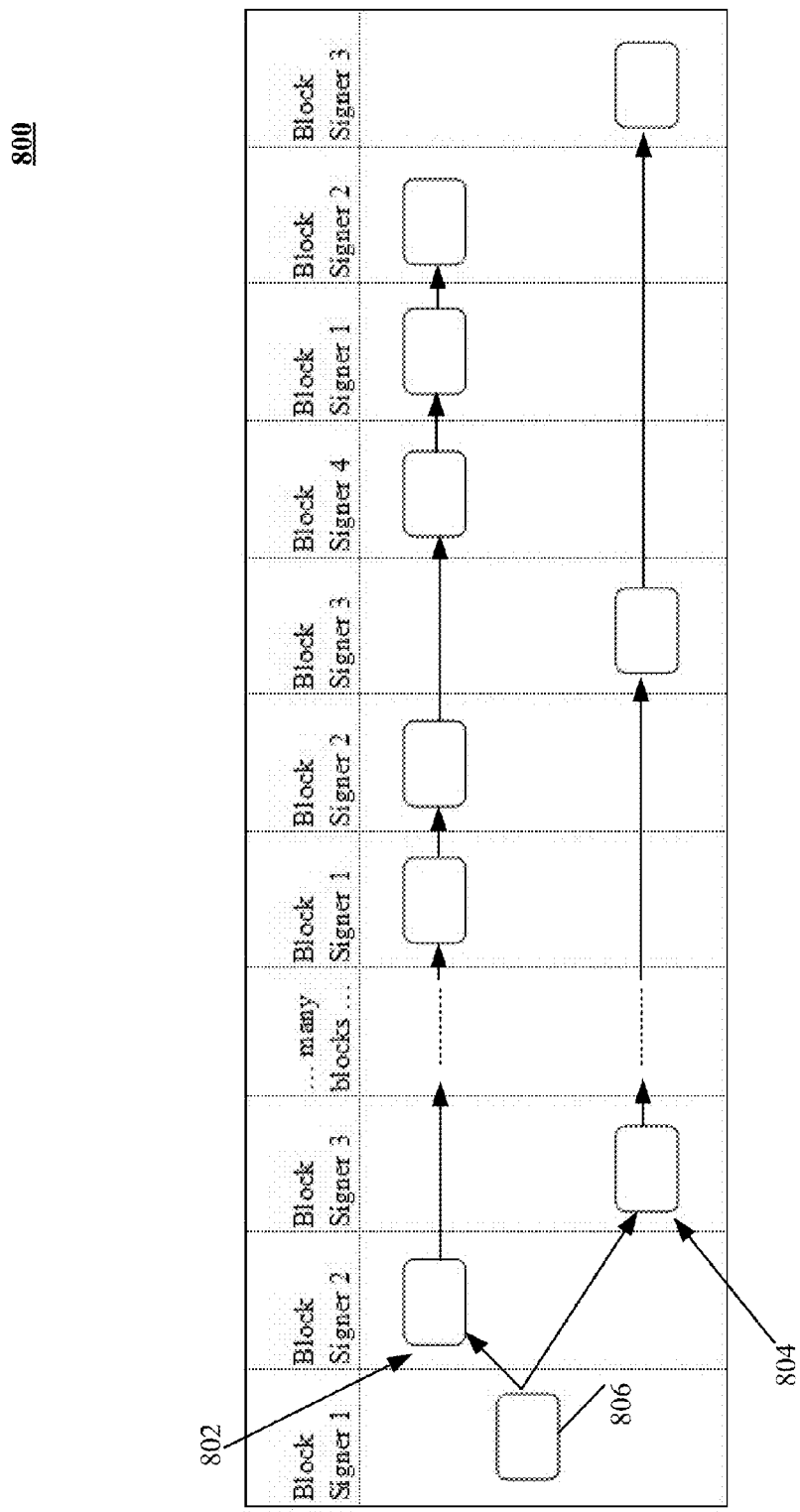
FIG. 8 is simplified diagram depicting a fork with a hidden fork chain in accordance with the teachings of this disclosure.

Turning to FIG. 8, a simplified diagram of a fork with two long fork chains is depicted and generally indicated at 800. The two fork chains 802 and 804 propagate from their last shared block 806. Additionally, we provide that the fork chain 802 was the publically known consensus chain at the time of its creation. A fork chain that was constructed publically is also referred to herein as an honest chain. The fork chain 804 was hidden from the network but later revealed in an attempt to alter the transaction history by replacing the previously known consensus chain 802.

Building a hidden chain that follows consensus rules requires control of at least one valid block signer. Election of a valid block signer requires a substantial stake or broad social deception to get enough signed votes. However, using a block signer that is currently producing blocks in the publically known chain requires double signing on the secret chain which would cause the secret chain to be rejected when it is revealed. In the example depicted at 800, Block Signer 3 stops producing blocks on the publically known consensus chain 802 in order to build a hidden chain 804. This may cause participants to vote against Block Signer 3, who is no longer publically producing blocks. Stakeholders are encouraged to quickly vote out block signers who stop producing blocks.

The producer of the hidden chain 804, despite having control of the valid elected Block Signer 3, still must overcome the challenge of producing a chain that is wider than the public chain. A hidden chain that is not as wide as the public chain it is designed to replace will be rejected by network participants. Participants making transactions on the public network will construct transactions such that they commit stake to the publically known consensus chain 802. For example, transactions will reference a recent block on the publically known consensus chain. These transactions cannot be included in the hidden chain 804 as they are invalid on that chain. Additionally, transactions that vote against block signer 3 will also commit stake to the public chain 802. It therefore requires substantial stake to build a hidden chain that is wider than the public chain.

Direct network observation is another method that allows a node to detect attempts to replace the known consensus ledger. Whenever the node remains connected to the network 100 it can record the order and time all transactions and blocks are received. This record coincides with the time blocks are made known to the network within a margin of error due to network transmission delays. This can be thought of as having direct or first-hand knowledge of whether a block or fork chain was intentionally hidden. It is important to note that direct network observation is not an unambiguous metric to achieve consensus.

For example, if a previously unknown block or fork chain is received that forks from a point on the block chain well in the past, it can be safely assumed that it was hidden from the network. This intentionally hidden fork chain may be rejected on the basis of direct network observation.

In the unlikely event that a wider hidden chain is successfully created, current block signers and other nodes that have remained connected to the network system 100 or have recently connected can detect that the chain was hidden due to direct network observation. Whenever a node remains connected to the network 100 it can record the order and time all transactions and blocks are received. This record coincides with the time blocks are made known to the network within a margin of error due to network transmission delays. This can be thought of as having direct or first-hand knowledge of whether a block or fork chain was intentionally hidden.

Direct network observation can be used as an additional measure to prevent the replacement of the public consensus ledger. A block signer may elect to not switch to a newly revealed fork chain that branched beyond a reasonably recent point in the past. A default for this parameter could be included with the consensus software application, such as 200 blocks. Alternatively it can be chosen individually by participants and block signers to be a number that is strongly indicative that the fork chain was intentionally hidden and not delayed by network issues. For example, a connected node will not automatically switch away from fork chain 802 to a new consensus chain if the point of the fork is beyond a predetermined number of blocks back at the time, even if the newly revealed chain is wider than the prior consensus chain.

It is important to understand that direct network observation does not provide an unambiguous metric for consensus. A user that has just connected to the network 100 after not being connected for a long time, such as weeks, cannot use direct network observation to determine which of two presented fork chains (such as the fork chains 802 and 804) came first. Therefore the underlying unambiguous consensus metric remains the widest chain metric. However, by not automatically switching to a newly revealed wider chain, it allows network participants who observe the attempt to replace the consensus chain to take action to prevent this from happening. These stakeholders can vouch for which chain came first and can facilitate correct fork resolution by committing stake to the honest chain.

A newly connected node selects the widest fork chain as the consensus chain by default. However, the user is warned if there are two chains of similar width or if the consensus chain is otherwise unclear. At that point the user may wait for other stakeholders to vote until there is a clear consensus widest chain. Alternatively this stakeholder can determine the honest fork chain based on the signatures and testimony of multiple independent non-colluding parties. This stakeholder can then select this chain within the consensus software application and facilitate fork resolution by committing stake to the honest fork chain determined based on said signatures and testimony.

Direct network observation functions to enable trust in the ledger because the combined signatures of many trusted parties and/or large stakeholders are sufficient evidence of which chain to trust even if a user had not remained connected to the network. With enough independent signatures of trusted parties, it is no longer reasonable to imagine that there was collusion among them. A particularly skeptical stakeholder can always choose to stay connected to the network to independently verify it or have a trusted friend monitor the network on her behalf.

Usually, a user should see a clear consensus chain. If two potentially valid forks are presented, the user should be sufficiently warned and use caution until it is sufficiently resolved. A serious fork is ultimately decided by majority vote of stakeholders until one fork chain is clearly the widest. The widest chain fork resolution can be helped along by stakeholders who vote for the honest chain by making transactions with their stakes that are only valid on that chain. Eventually stakeholders will vote for one chain over another so that it is clear where the consensus resides. Ultimately these systems facilitate accounting of a social agreement and, if by no other means, are resolved by social agreement. A social agreement can also be made to accept a consensus system software application version that contains a check point that unambiguously rejects any fork chains that do not contain the checkpoint block. This excludes any potential fork chains that fork from a point on the block chain before the check point.

An alternate implementation makes it possible to prevent censorship and block chain control by collusion of even 100% of block signers. In such a case, nodes are allowed to accept a block from a candidate block signer if the block includes sufficient votes for her own election. In such a case, even if all transactions for new block signers are censored by current block signers there is still a method to elect a new block signer.

The consensus system 100 provides a decentralized consensus for digital object tracking that can be relied upon and trusted. Complex fork merging and resolution logic should not add much overhead to running the consensus system software application because forks should be rare and misbehaving block signers should be voted out. Peers that send invalid information can be disconnected. It should be noted that stake based consensus protocols allow block signers to be controlled by any party with over 50% stake. The present disclosure provides a consensus model that improves upon prior consensus algorithms to ensure that control of the consensus ledger is not wrested by parties owning considerably less than 50% of stake. Digital stake tracking systems are typically voluntary participation systems that are subject to audit by all participants. Even though the recording function of the system can be controlled by 51% of the stake, it does not preclude a minority from forming a social consensus around a different stake allocation they find useful or that eliminates stake that has been involved in malicious behavior.

Price Volatility of Digital Tokens

The price volatility of crypto-currencies can decrease their utility. For instance it is difficult to price goods in terms of Bitcoin due to the change of the value of a Bitcoin.

Attempts to address the issue with digital tokens that represent an IOU from a particular party or issuer suffer from counterparty risk if the issuer fails to honor the digital token with the conventional asset it represents.

The real time stake weighted approval voting system used to elect block signers is also useful to elect trusted representatives that can provide a trusted data feed that can be used to enforce a virtual contract that results in the creation of digital assets that track the value of conventional assets (such as US Dollar and gold) with limited risk. These assets are referred to herein as market pegged assets ("MPAs"). An MPA that tracks the value of the US Dollar is referred to herein as bitUSD.

A conventional crypto-currency system has an underlying fungible coin, token, or stake that is referred to herein simply as stake. Stake can be traded against standard currency such as US Dollars on exchange websites that facilitates these trades. The exchange rate is typically very volatile. A market pegged asset can be viewed as a contract between an asset buyer seeking an asset with stable value and a short seller seeking greater exposure to the price movement of the underlying digital stake. The consensus system software program that implements the digital consensus ledger system also implements a decentralized marketplace for MPAs where all transactions are recorded on the shared block chain ledger and the consensus system software program enforces the market rules. This block chain based marketplace is referred to herein as an internal market to distinguish from external markets, such as websites that facilitate the exchange of government issued currencies with crypto-currency.

A stakeholder may use her stake to place a buy order on this internal market for an MPA. MPAs are created on the block chain when a buyer and a short seller are matched at an agreed price. In exchange for the stake received from the MPA buyer, the short seller takes on the obligation of buying back the same quantity of MPAs in the future from the market. Stake paid by the MPA buyer and additional stake contributed by the short seller are sequestered as collateral. This collateral is only returned to the short seller when MPAs are purchased back from the market and effectively destroyed to fulfill the contract. This is referred to as covering a short. If the value of the collateral relative to the current price of the coins falls below a certain margin of safety, MPAs can be automatically repurchased from the market before collateral becomes insufficient. These rules create systemic demand for MPAs while allowing them to remain fungible and transferrable.

The system 100 does not specifically restrict the internal exchange rate between stake and bitUSD in a way that ensures it will track the external exchange rate between coins and USD. A first step toward this goal is to get reliable information about the external exchange rate into the internal market algorithm. It is not immediately obvious how this is accomplished in a way that is resistant to control and manipulation by a central party. As previously discussed, a real-time stake weighted auditable approval voting system allows for dynamic selection of trusted parties from a decentralized system. These same trusted parties can be used to input external exchange rates into the block chain so that the consensus system software application can incorporate this information into the market rules.

This external exchange rate information is called a price feed. The trusted representatives can consolidate price information from multiple sources, such as external exchanges, to generate a price feed and update it regularly. The system takes a median of all price feeds so that manipulation of the price information would be very difficult by any single party without considerable collusion. The data feed and other behavior by trusted representatives is publically auditable and representatives may be voted out at any time.

Both stake and MPAs are freely transferrable tokens. If the internal market restricted trading occurs only at the specific exchange rate determined by the median price feed, it would simply encourage anyone willing to trade at a different price to do so outside the system, such as on an external exchange. However, if short selling is the mechanism by which new MPAs are created, then selectively restricting short selling controls the conditions under which supply is created. Rather than allow short sellers to sell at any price, short sellers will only execute at a price above the median price feed. This prevents short sellers from devaluing MPAs as new MPAs are only created when the market demand pushes the price equal to or above parity.

The price feed functions to regulate the creation and destruction of MPAs in a way that pushes the market price toward parity. When a short seller buys back bitUSD and covers their position, they are taking bitUSD out of circulation and reducing the total supply. It is also useful to enforce that short sellers must cover their position after a certain amount of time, such as one year. In other words, the full amount of outstanding MPA must be purchased off the market every year. MPA holders have no requirement to sell and therefore short sellers covering their positions are eventually forced to purchase from newly opened short positions at or above the exchange rate. This is effectively a guarantee to any bitUSD holder that they can sell bitUSD for at least the dollar equivalent of the underlying stake (determined by price feed) within any one year period.

The motivation to participate in the system is different for short sellers and MPA buyers. MPA holders are typically looking for predictable value coupled with the properties of a crypto-currency. Short sellers are typically bullish on the price of the underlying stake and wish to capitalize on increased exposure to market movement relative to the MPA. If the market value of stake rises with respect to the MPA, the short seller can buy back the MPA for significantly less stake and profit accordingly. If stake value falls in relation to the MPA, the short seller faces a greater loss than if they were to have simply held stake. Ultimately a short seller may face a margin call where her collateral is automatically used to repay the obligation. A margin call is triggered whenever collateral falls below a particular margin of safety with respect to the current exchange rate. For example, the rule can specify if less than 1.5 times the amount of stake held in collateral is required to cover the obligation a margin call is triggered. The margin call automatically buys back MPAs from the market and destroys them to fulfill the contract.

There is some risk to relying on the value of an MPA. MPAs maintain their price parity due to being backed by collateral that has an established real world value. When the value of the collateral falls, the system 100 is designed to react by driving the internal asset exchange to match the new real world exchange rate and trigger margin calls as necessary. However, there exists a possibility that the underlying collateral stake drops in value so quickly that the MPAs become under-collateralized. This situation is termed as a black swan event. Such a sudden crash of stake value could prevent the system from adjusting in time. In this event, the full amount of collateral is no longer sufficient to purchase MPAs back from the market at the new real exchange rate.

MPAs may then trade below their face value. The system 100 is capable of quickly adjusting to a wide variety of market conditions.

Figure 12:
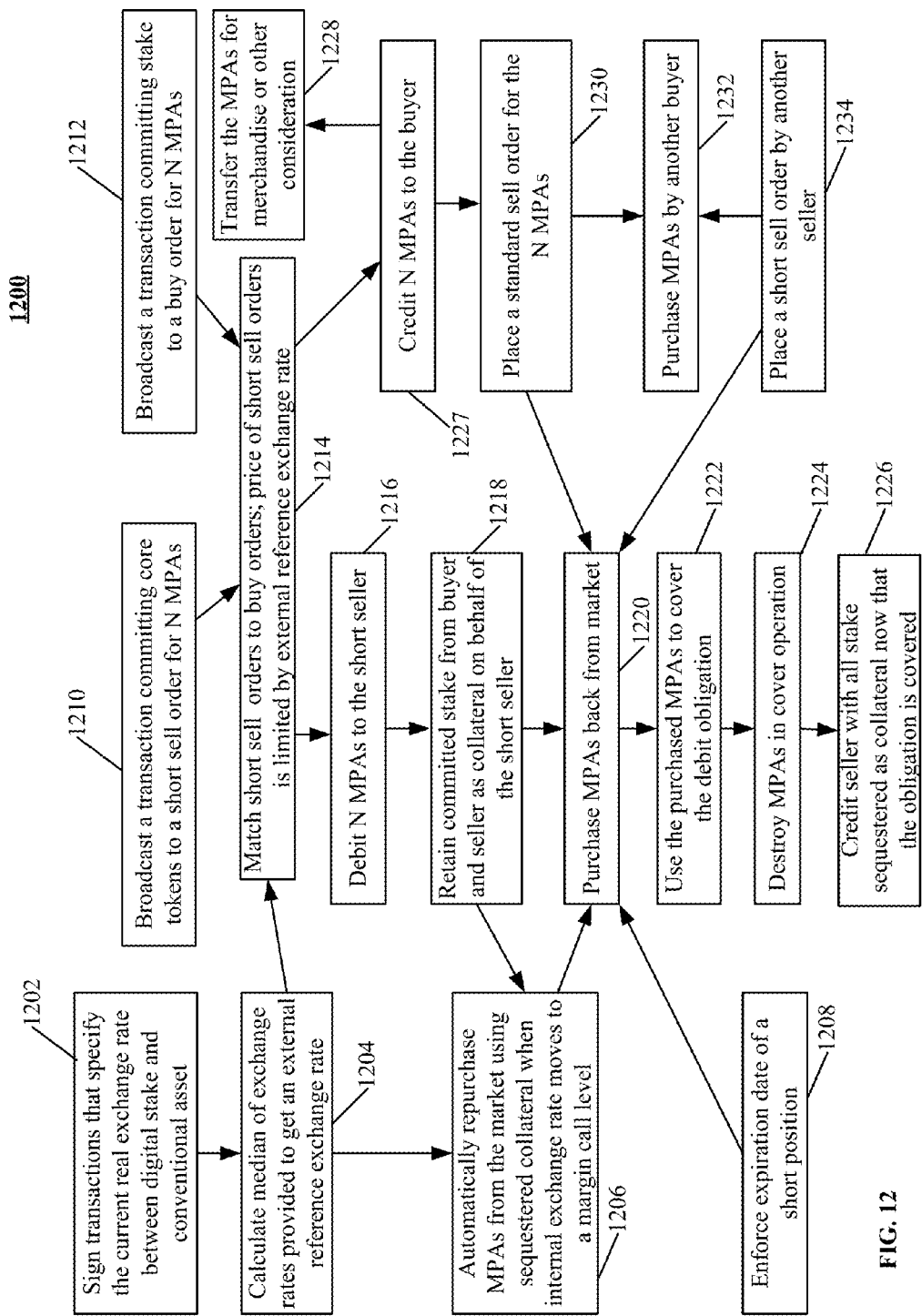
FIG. 12 is a flowchart depicting a process by which a consensus system reduces price volatility of digital tokens in accordance with the teachings of this disclosure.

MPA is further illustrated by reference to FIG. 12. Referring to FIG. 12, a flowchart depicting a process by which the consensus system 100 reduces price volatility of digital tokens is shown and generally indicated at 1200. MPAs require a consensus ledger system that tracks an underlying digital stake with variable price. At 1202, block signers, or similarly elected representatives, sign transactions that specify the current real exchange rate between stake and a conventional asset, such as USD or gold. At 1204, the system 100 selects a median exchange rate as the external reference exchange rate for that asset. Alternatively, a different statistical measure of the exchange rate is selected. The external reference exchange rate is used at 1214.

At 1210, a short seller uses her node computer to broadcast a transaction committing stake to a short sell order for N (a positive integer, such as 10) MPAs. At 1212, a buyer uses her node computer to broadcast a transaction committing stake to a buy order for N MPAs. At 1214, the system 100 matches the short sell order with the buy order. The matched buy order must offer at least as much stake per MPA as asked by the sell order it is matched with. The matched short sell order must charge at least as much stake per MPA as the external reference exchange rate. Price of short sell orders is limited by external reference exchange rate. At 1227, the system 100 credits N MPAs to the buyer.

At 1216, the system 100 debits N MPAs to the short seller. At 1218, the system retains the stake committed by both the short seller and buyer as collateral on behalf of the short seller until the debit obligation is paid. At 1220, the short seller purchases N MPAs back from the market. At 1222, the purchased MPAs are used to cover the debit obligation. At 1224, the MPAs are destroyed in a cover operation. At 1226 the short seller is credited all stake that was sequestered as collateral now that her MPA obligation is covered.

At 1228, an MPA owner transfers MPAs to another user for merchandise or other consideration. At 1230, an MPA owner places a standard sell order on the internal market for the N MPAs that she owns. These MPAs are purchased in exchange for stake at 1220. At 1232, another buyer purchases MPAs. At 1234, another short seller places a short sell order on the internal market.

At 1206, when the internal market exchange rate moves to a margin call level, the system 100 automatically purchases MPAs from the market using sequestered collateral. In such as case, the MPAs are purchased at 1220. MPAs are also purchased at 1220 when the system 100 enforces the expiration date of a short position at 1208.

Figure 15:
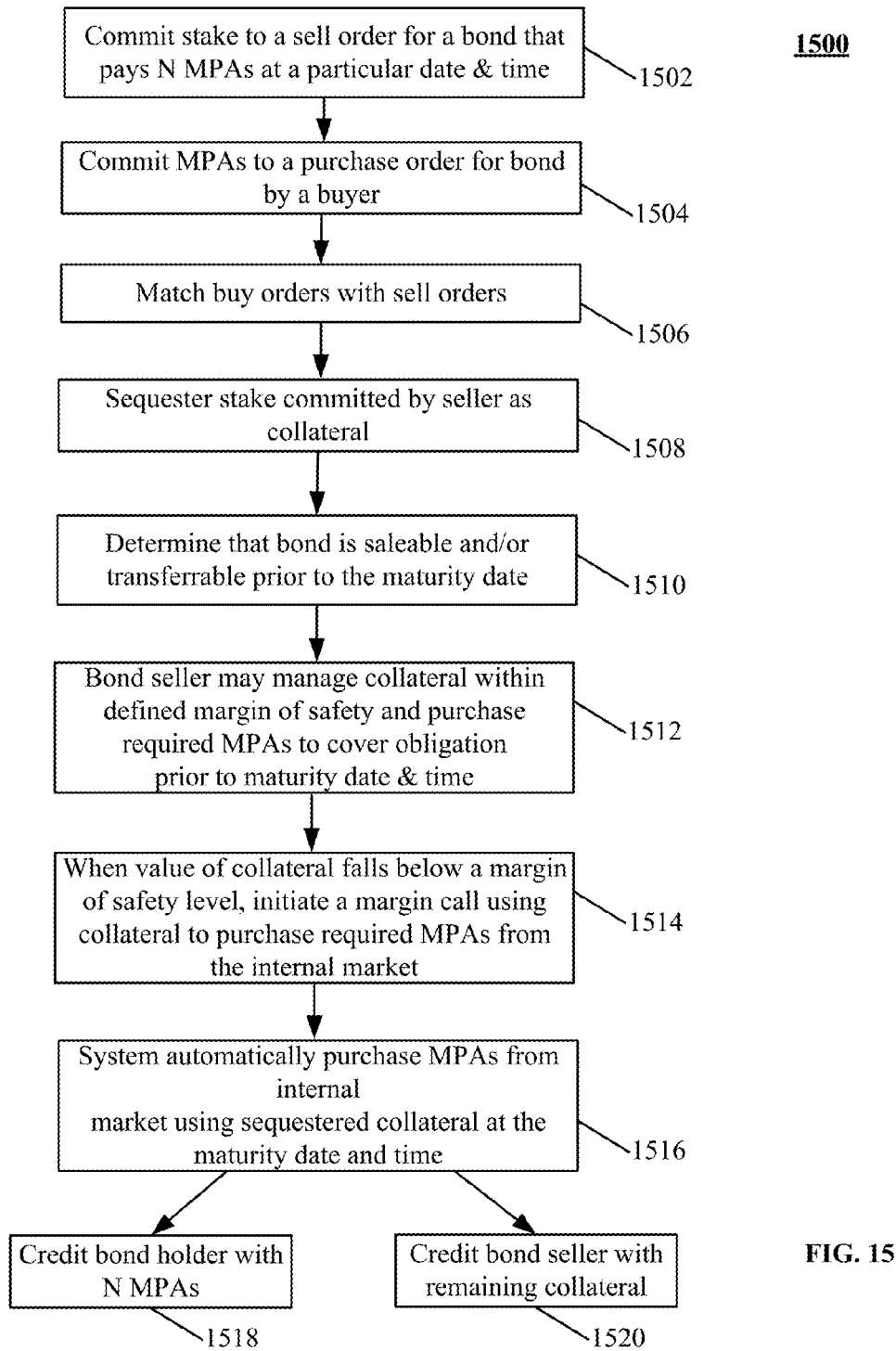
FIG. 15 is a flowchart depicting a process by which a consensus system creates a bond market for pegged digital assets in accordance with the teachings of this disclosure.

Market pegged assets allow users to store and transact value in a convenient manner. The implementation of market pegged assets additionally allows for the creation of collateralized bonds. Turning to FIG. 15, a system and method for implementing a collateralized bond on a digital record consensus system is generally depicted at 1500. At 1502 a stakeholder broadcasts a transaction that commits stake as collateral and offers a bond for sale that pays N MPAs at a particular date and time. The sale offer also has an asking price denominated in MPAs or stake. At 1504 a buyer broadcasts a transaction that offers the asking price for the bond and commits the required amount of stake or MPAs to this transaction. At 1506 the consensus software application running on each node matches buy orders with sell orders and the buyer is credited with the purchased bond. At 1508 the stake committed by the bond seller is sequestered as collateral.

The bond can be thought of as a promise to pay a certain amount of MPAs at a specific date and time and this promise is further enforced by the consensus protocol. At 1510 it is noted that the bond is saleable or transferrable prior to the maturity date via transactions on the consensus system. At 1512, the bond seller/obligor can purchase the required MPAs to cover the obligation prior to the maturity date. In one embodiment this could pay the MPAs to the bond holder and close out the bond prior to the maturity date. In another embodiment the bond obligor could manage the collateral within a margin of safety defined by the protocol. For example the bond obligor could buy some MPAs with the stake collateral and retain a combination of MPAs and stake as collateral prior to the maturity date.

At 1514 the value of the stake collateral falls below a defined margin of safety with respect to the obliged amount of MPAs (face value of the bond). The collateral is then automatically used to purchase MPAs off the internal market place to ensure the obligation can be met to pay the MPAs to the bond holder at the maturity date.

When the maturity date and time is reached the sequestered collateral is automatically used to purchase any MPAs needed to pay the bond. The MPAs are purchased from the internal MPA market of the system. At 1518 and 1520 the bond is settled. The bond holder receives the owed MPAs and the bond seller is credited the remaining collateral. The bond market allows MPA holders to get a return on investment as the bond will typically cost less in terms of MPAs than the amount it pays at the maturity date. It allows bond obligors additional exposure to price movement of the underlying stake.

Vote Directed Capital in a Digital Object Tracking System

A major challenge for digital object tracking systems is a lack of sufficient incentives to fund on-going development. In the past, on-going funding for development has been provided by donations from non-profit organizations, large stakeholders, or companies that use the system, such as a company that sells related services. Recently, assurance contracts have begun to be used for fundraising. A more efficient system that creates better incentives to speed up reinvestment into ongoing development is desirable and necessary.

Figure 13:
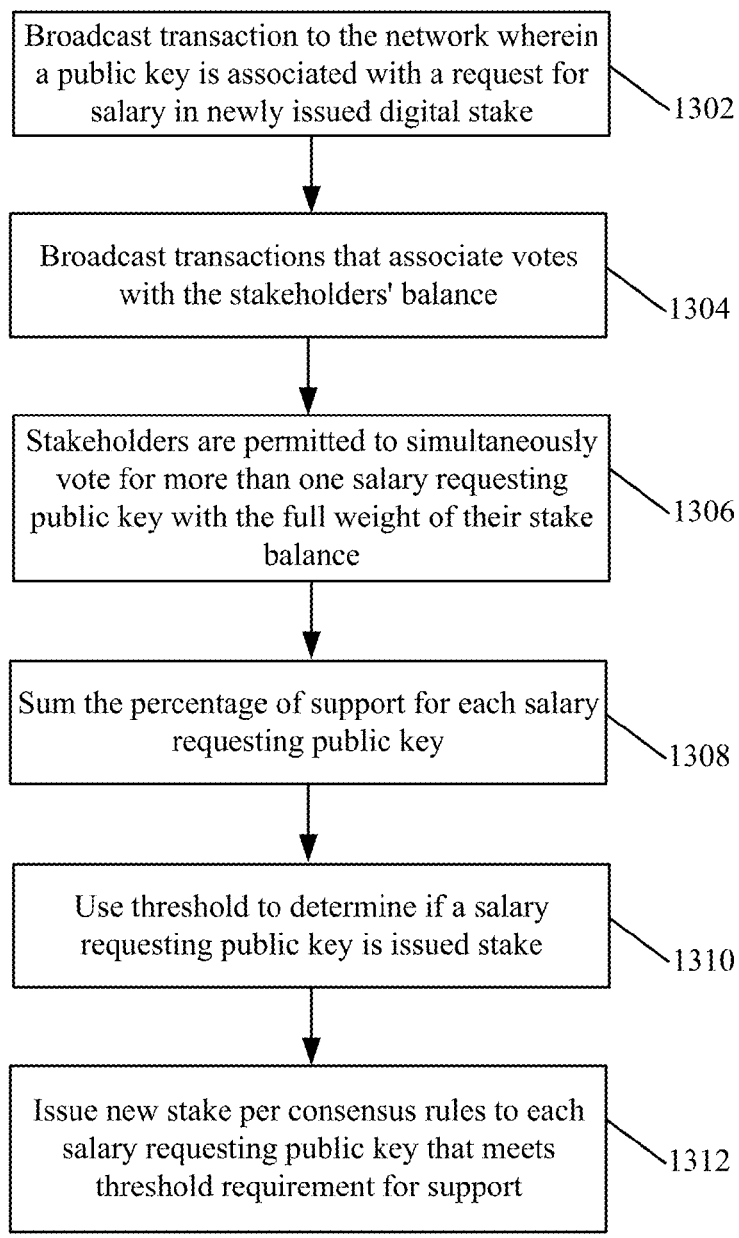
FIG. 13 is a flowchart depicting a process performed by a consensus system for managing digital stake based on votes in accordance with the teachings of this disclosure.

The real time stake weighted auditable approval voting method previously discussed can also be used to direct issuance of new stake or otherwise centralize capital into the hands of trusted parties who can work in the interests of the stakeholders. The illustrative embodiment shown in FIG. 13 is a flow chart of a process of digital stake managed by votes. At 1302 a candidate worker can register a public key and describe a service they intend to provide to stakeholders such as software development. This public key is associated on the consensus ledger with a request for a specified salary denominated in the digital stake tracked by the ledger. This public key is described as a salary requesting public key. At 1304, stakeholders broadcast transactions that approve a salary requesting public key. These transactions are signed with the private keys corresponding to each stakeholders stake balance. At 1306 multiple salary requesting public keys can be simultaneously approved with the full weight of a single stake balance. Approving one salary requesting public key does not inherently remove support for another. At 1308 the percentage of support from stake is summed for each salary requesting public key. At 1310 a threshold is used by the consensus system software application to determine which keys are granted the requested salary. Unlike in the case of block signers, election of candidate workers is not required for the digital object tracking system to function. Therefore, a simpler threshold such as 50% or more approval may be used. The approval level must be reached for the new stake to be issued to fund the candidate worker or project. At 1312 new stake is issued per consensus rules to each salary requesting public key that meets threshold requirement for support. This stake is reflected in the current ledger maintained by each copy of the consensus system software application. In other words, the consensus ledger built by each copy of the consensus software application reflects the issuance of new stake to the control of the eligible salary requesting public keys. The candidate can then sell this stake on the open market to pay for expenses associated with work performed.

In one embodiment the salary is specified at the time the candidate worker registers a salary requesting public key. In an alternate embodiment stakeholders could specify a salary or a percentage of a requested salary at the time of voting. This percentage could be above or below the requested salary and a median can be taken to determine the actual paid salary. In another embodiment an optional timeframe could be specified for a more limited project.

Figure 14:
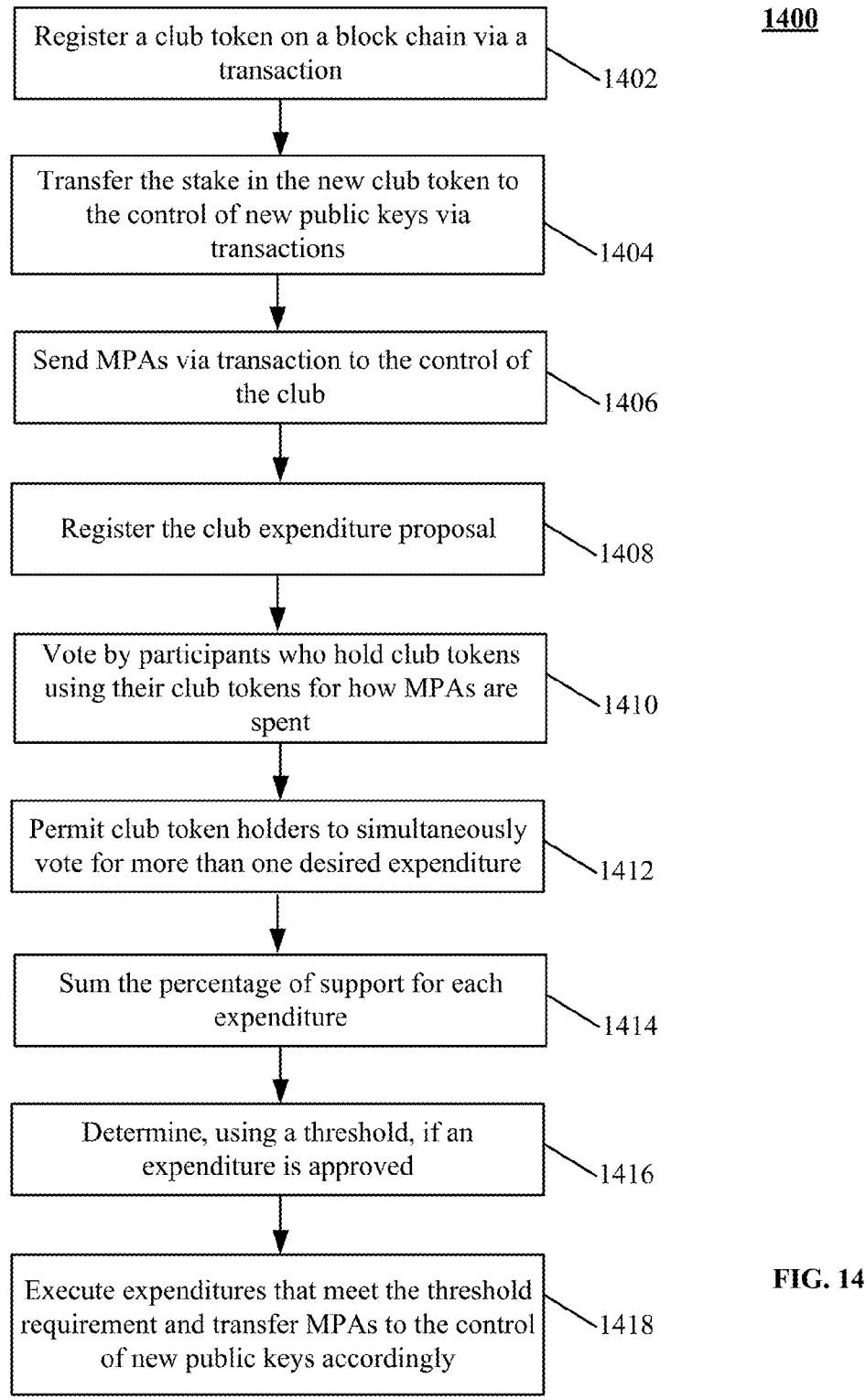
FIG. 14 is a flowchart depicting a process by which a consensus system creates tokens that represent digital stake in a club in accordance with the teachings of this disclosure.

Turning now to FIG. 14, an alternate embodiment of a process for managing digital objects with votes is shown and generally indicated at 1400. At 1402 a club token is registered on the block chain via a transaction. A club token can be thought of as a digital asset that is distinct from the underlying stake of the consensus system on which it is tracked. Registering an asset on a block chain typically involves assigning the asset a descriptive name, specifying a quantity, and paying a transaction fee denominated in the underlying stake of the consensus system. Named assets registered on a block chain are often used to represent something external to the system. In this case a club token is used to represent a stake in a group enterprise or club.

At 1404 club tokens can be transferred from the control of the public key that registered the club token to new public keys, such as to the public keys of other members of a club. At 1406 market pegged assets can be transferred to the club rather than to the control of a particular public key. At 1408 a club expenditure proposal is registered via on the block chain. At 1410 participants who own club tokens can vote for club expenditures by associating their balance of club tokens with a vote of support for a particular expenditure. At 1412 participants can simultaneously vote for more than one proposed club expenditure with the full weight of their currently controlled balance of club tokens. At 1414 the percentage of club tokens voting in support of each expenditure proposal is summed. At 1416 a support threshold is used to determine which expenditures are approved (such as 50% support of club tokens). At 1418 expenditures that meet the threshold requirement are executed and MPAs that are held by the club are transferred to the public key specified in the expenditure proposal. Approved expenditures would be subject to availability of funds held by the club. For instance, funds could release on a first come first served basis until funds are exhausted.

Obviously, many additional modifications and variations of the present disclosure are possible in light of the above teachings. Thus, it is to be understood that, within the scope of the appended claims, the disclosure may be practiced otherwise than is specifically described above without departing from the true spirit and scope of the present invention.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

Computer Program Listing A:

```
#include <iostream>
#include <vector>
#include <algorithm>
struct vote {
   float yweight;
   float xweight;
};
struct voter {
   int id;
   float sharefraction;
   std::vector<int> approved;
};
struct candidate {
   std::vector <vote> approvals;
   float total;
   int id;
};
struct candidateCompare {
   bool operator( ) ( const candidate a, const candidate b ) {
      return a.total > b.total;
   }
} cComp;
struct voterCompare {
   bool operator( ) ( const voter a, const voter b ) {
      return a.approved.size( ) > b.approved.size( );
   }
}vComp;
void distribute (std::vector<voter> &voters,
std::vector<candidate> &candidates){
   for (int i=0; i<candidates.size( ); i++){
      candidates[i].total =0.0;
      candidates[i].approvals.clear( );
   }
   sort(voters.begin( ),voters.end( ),vComp);
   for (int i=0; i<voters.size( ); i++){
      float yweight = (float)voters[i].sharefraction;
      float xweight = 1.0/(float)voters[i].approved.size( );
      for ( int v=0; v<voters[i].approved.size( ); v++) {
         int c = voters[i].approved[v];
         std::vector<candidate>::iterator candidate;
         for( candidate=candidates.begin( );
         candidate!=candidates.end( ); candidate++)
         {
            if( candidate->id == c) break;
         }
         if (candidate == candidates.end( ) ) continue;
```

Computer Program Listing A:

```
            candidate->total += yweight;
            vote newVote;
            newVote.yweight = yweight;
            newVote.xweight = xweight;
            candidate->approvals.push_back(newVote);
         }
      }
}
int elect(std::vector<voter> &voters, std::vector<candidate>
&candidates){
   sort(candidates.begin( ),candidates.end( ),cComp);
   int keep = 0;
   float xsum = 0;
   int last = -1;
   while( xsum < 1.0 || (last == candidates[keep].total) ) {
      keep++;
      if (keep == candidates.size( )) {
         break;
      }
      xsum = 0;
      for( int i=0; i<keep; i++) {
         float y = candidates[i].total - candidates[i].approvals[0].yweight;
         int a = 0;
         while( y>candidates[keep].total ) {
            a++;
            y -= candidates[i].approvals[a].yweight;
         }
         xsum += candidates[i].approvals[a].xweight;
         last = candidates[keep-1].total;
      }
   }
   return keep;
};
int main( )
{
   using namespace std;
   bool ok = true;
   float share;
   std::vector<voter> voters;
   std::vector<candidate> candidates;
   while(ok){
      std::cout << "Enter balance (shares) or enter 0 if done:";
      std::cin >> share;
      if(share <= 0){
         ok = false;
      } else {
         voter newVoter;
         newVoter.id = (int)voters.size( )+1;
         newVoter.sharefraction = share;
         newVoter.approved.clear( );
         voters.push_back(newVoter);
      }
   }
   std:: cout << "Total voting balances are:" << voters.size( ) << "\n";
   int count;
   ok = true;
   std::cout << "Enter number of block signer candidates:";
   std::cin >> count;
   for (int c = 0; c < count; c++){
      candidate newCandidate;
      newCandidate.id = (int)candidates.size( )+1;
      newCandidate.total = 0.0;
      candidates.push_back(newCandidate);
   }
   while(ok){
      int v;
      cout << "Enter balance ID: (1-" << voters.size( ) <<") : ";
      cin >> v;
      vector<voter>::iterator voter;
      for( voter=voters.begin( ); voter!=voters.end( ); voter++ ) {
         if( voter->id == v) break;
      }
      if (voter == voters.end( ) ) {
         cout << "Invalid balance ID \n";
         ok = false;
         continue;
      }else {
```

Computer Program Listing A:

```
         voter->approved.clear( );
         int delegateID;
         bool voting = true;
         while(voting){
            cout << "Enter delegate ID: (1-" << candidates.size( )
<< ") or 0 to stop voting: ";
            cin >> delegateID;
            if (delegateID<1 || delegateID>candidates.size( ) ) {
               cout << "The elected candidates are:\n";
               voting = false;
            } else {
               voter->approved.push_back(delegateID);
            }
         }
      }
      distribute(voters, candidates);
      int keep = elect(voters, candidates);
      for (int c=0; c<keep; c++) {
         cout << "candidate #" << candidates[c].id << "\t votes "
<< candidates[c].total<< "\n";
      }
   }
   return 0;
}
```

What is claimed is:

1. A decentralized consensus system for tracking transferable digital objects, the system comprising:
   i. a plurality of node computers, each node computer in said plurality of node computers including a processing unit, some amount of memory accessed by said processing unit, and a network interface operatively coupled to said processing unit and a wide area network connecting said plurality of node computers;
   ii. each node computer within said plurality of node computers including a consensus system software application running on said processing unit of said node computer; and
   iii. said consensus system software application adapted to:
      1) load an initial ledger containing a first set of digital objects;
      2) connect to peer nodes over said wide area network;
      3) download block chain data from connected peer nodes, said block chain data including one or more data block chains, each data block chain within said one or more data block chains including a set of data blocks, each data block within said set of data blocks including a set of transactions and signed by one or more block signers within a set of block signers;
      4) check validity of said block chain data using a set of consensus rules to determine whether data blocks within said set of data blocks follow a set of protocol rules;
      5) where said block chain data includes more than one data block chain, determine a consensus data block chain based on a most committed stake metric, wherein said consensus data block chain includes a set of valid transactions and a set of valid data blocks;
      6) pass said set of valid transactions and said set of valid data blocks to one or more connected peers over said wide area network, wherein said set of valid transactions and said set of valid data blocks are verified to follow said set of protocol rules; and
      7) maintain a current ledger, said current ledger built from said initial ledger, said valid transactions and said valid data blocks.

2. The decentralized consensus system of claim 1, wherein:
- i) each digital object within said first set of digital objects includes a balance and a collection of votes for a set of block signer candidates; and
- ii) said consensus system software application is further adapted to:
  - 1) determine an approval width for each said balance based on said collection of votes for said balance;
  - 2) order said first set of digital objects based on said approval width;
  - 3) determine a set of intermediary approvals, a summed approval and an approval height for each block signer candidate within said set of block signer candidates based said balance and said collection of votes;
  - 4) from said set of block signer candidates, select a first block signer candidate with a highest summed approval;
  - 5) from said set of block signer candidates, select a second block signer candidate with a next highest summed approval;
  - 6) determine a set of mapped approval widths of said second block signer candidate; and
  - 7) where a sum of said set of mapped approval widths is below a predetermined threshold, select said second block signer candidate to sign data blocks.

3. The decentralized consensus system of claim 1, wherein said consensus system software application is further adapted to reject a first block within said set of data blocks when said first block fails to follow said set of protocol rules.

4. The decentralized consensus system of claim 1, wherein:
- i) said more than one data block chain includes a first fork chain and a second fork chain; and
- ii) said consensus system software application is further adapted to:
  - 1) identify a set of most recent blocks on said first fork chain as double signed blocks;
  - 2) determine a first committed stake from said first fork chain, wherein transactions included in said double signed blocks do not add to said first committed stake;
  - 3) determine a second committed stake from said second fork chain;
  - 4) derive said most committed stake metric from said first committed stake and said second committed stake;
  - 5) from said first fork chain and said second fork chain, select a widest chain corresponding to said most committed stake; and
  - 6) merge said first fork chain and said second fork chain into a consensus data block chain, wherein a transaction in said widest chain is included over a conflicting transaction, wherein said conflicting transaction is in a fork chain different from said widest chain in the resulting consensus ledger.

5. The decentralized consensus system of claim 1, wherein:
- i) said first committed stake is a sum of common balances between said first fork chain and said second fork chain that are used in unique transactions of said first fork chain; and
- ii) said second committed stake is a sum of common balances between said first fork chain and said second fork chain that are used in unique transactions of said second fork chain.

6. The decentralized consensus system of claim 1, wherein said consensus system software application is further adapted to:
- i) generate a private and public pair including a private key and a public key;
- ii) display a transaction that sends stake to said public key;
- iii) build and sign a first new transaction transmitting a stake to a different user;
- iv) broadcast said first new transaction to said connected peer nodes;
- v) build and sign a second new transaction including a vote; and
- vi) broadcast said second new transaction to said connected peer nodes.

\* \* \* \* \*